(12) United States Patent
Schwarzkopf et al.

(10) Patent No.: US 9,360,147 B2
(45) Date of Patent: Jun. 7, 2016

(54) HEATABLE FLUID LINE, USE THEREOF AND METHOD FOR PRODUCING SAME

(75) Inventors: Otfried Schwarzkopf, Kürten (DE); Mark Heienbrok, Engelskirchen (DE); Marco Isenburg, Ratingen (DE); Markus Jeschonnek, Wipperfürth (DE); Christoph Schöneberg, Wipperfürth (DE); Manfred Berg, Wipperfürth (DE); Josef Brandt, Wipperfürth (DE); Tobias Etscheid, Lindlar (DE); Horst Plum, Bergisch Gladbach (DE)

(73) Assignee: VOSS Automotive GmbH, Wipperfurth (DE)

(*) Notice: Subject to any disclaimer, the term of this patent is extended or adjusted under 35 U.S.C. 154(b) by 377 days.

(21) Appl. No.: 13/992,553

(22) PCT Filed: Oct. 7, 2011

(86) PCT No.: PCT/EP2011/067568
§ 371 (c)(1),
(2), (4) Date: Aug. 12, 2013

(87) PCT Pub. No.: WO2012/076217
PCT Pub. Date: Jun. 14, 2012

(65) Prior Publication Data
US 2013/0330065 A1    Dec. 12, 2013

(30) Foreign Application Priority Data
Dec. 8, 2010 (DE) .......... 10 2010 053 737

(51) Int. Cl.
*E03B 7/10* (2006.01)
*F16L 53/00* (2006.01)
(Continued)

(52) U.S. Cl.
CPC ............. *F16L 53/004* (2013.01); *F01N 3/2066* (2013.01); *F16L 25/01* (2013.01);
(Continued)

(58) Field of Classification Search
None
See application file for complete search history.

(56) References Cited

U.S. PATENT DOCUMENTS 3,603,403 A * 9/1971 Horwinski ........... A62C 35/605
                                                                169/5
7,853,132 B2    12/2010 Muller
(Continued)

FOREIGN PATENT DOCUMENTS

DE    10060316 A1    6/2002
DE    10201920 A1    8/2003
(Continued)

OTHER PUBLICATIONS

International Search Report of PCT/EP2011/067568 Mailed on Jan. 11, 2012, 5 pages.

*Primary Examiner* — Thor Campbell
(74) *Attorney, Agent, or Firm* — Eric J. Sosenko; Jonathan P. O'Brien; Honigman Miller Schwartz and Cohn LLP

(57) ABSTRACT

A heatable fluid line having a pipeline and an electrical heat conductor extending at least over a section of the pipeline. The pipeline has at least two longitudinal sections that are configured differently in respect of the material properties and/or design thereof. At least one first longitudinal section is formed of a first material and a second longitudinal section is formed of a second material. The material of the second longitudinal section is more flexible and/or has a higher resilience than the material of the first longitudinal section. A described method for producing the fluid line relates to an adaptive attachment of the heat conductor on the outside of the pipeline that permits the heat conductor to be wound around fluid coupling and/or connector parts, in particular the housings by means of which the line is assembled, without strand separation.

32 Claims, 10 Drawing Sheets

(51) Int. Cl.
  *F01N 3/20*   (2006.01)
  *F16L 25/01*  (2006.01)
  *H05B 3/58*   (2006.01)
  *A47J 31/00*      (2006.01)

(52) U.S. Cl.
  CPC ............... *F16L 53/008* (2013.01); *H05B 3/58* (2013.01); *F01N 2610/02* (2013.01); *F01N 2610/10* (2013.01); *H05B 2203/021* (2013.01); *Y02T 10/24* (2013.01); *Y10T 29/49083* (2015.01)

(56)  References Cited

U.S. PATENT DOCUMENTS

| | | | | |
|---|---|---|---|---|
| 7,986,870 | B2* | 7/2011 | Bruck | B01D 53/90 392/307 |
| 8,107,799 | B2* | 1/2012 | Hirth | B01B 1/005 29/527.5 |
| 8,145,044 | B1* | 3/2012 | Wirt | B01D 53/90 392/394 |
| 8,238,733 | B2  | 8/2012 | Sawada et al. | |
| 8,301,020 | B2* | 10/2012 | Wildegger | B60S 1/487 219/205 |
| 8,424,777 | B2* | 4/2013 | Mokire | F01N 3/2066 237/12.3 R |
| 8,452,167 | B2* | 5/2013 | Leonard | F01N 3/2066 239/135 |
| 8,625,978 | B2* | 1/2014 | Potier | F01N 3/2066 392/441 |
| 8,965,187 | B2* | 2/2015 | Borgmeier | F16L 53/008 219/484 |
| 2008/0202473 | A1* | 8/2008 | Cook | F01N 3/2066 123/478 |
| 2009/0238547 | A1* | 9/2009 | Borgmeier | H05B 3/56 392/465 |
| 2010/0144182 | A1  | 6/2010 | Dude et al. | |
| 2010/0290764 | A1* | 11/2010 | Borgmeier | F16L 25/01 392/468 |
| 2012/0008927 | A1  | 1/2012 | Borgmeier | |
| 2012/0100735 | A1  | 4/2012 | Rosenfeldt et al. | |
| 2012/0234421 | A1  | 9/2012 | Powell et al. | |
| 2015/0240693 | A1* | 8/2015 | Birman | F24H 1/102 392/488 |

FOREIGN PATENT DOCUMENTS

| | | |
|---|---|---|
| DE | 202005004602 U1 | 7/2005 |
| DE | 102006006211 B3 | 9/2007 |
| DE | 102006060314 A1 | 6/2008 |
| DE | 102007024782 A1 | 11/2008 |
| DE | 202008013907 U1 | 4/2010 |
| DE | 202009012230 U1 | 12/2010 |
| EP | 1793152 A1 | 6/2007 |
| EP | 1985908 A1 | 10/2008 |
| WO | 2006024715 A1 | 3/2006 |
| WO | 2006097765 A1 | 9/2006 |
| WO | 2007032033 A1 | 3/2007 |
| WO | 2007041974 A1 | 4/2007 |
| WO | 2008131993 A1 | 11/2008 |
| WO | 2009013342 A2 | 1/2009 |

* cited by examiner

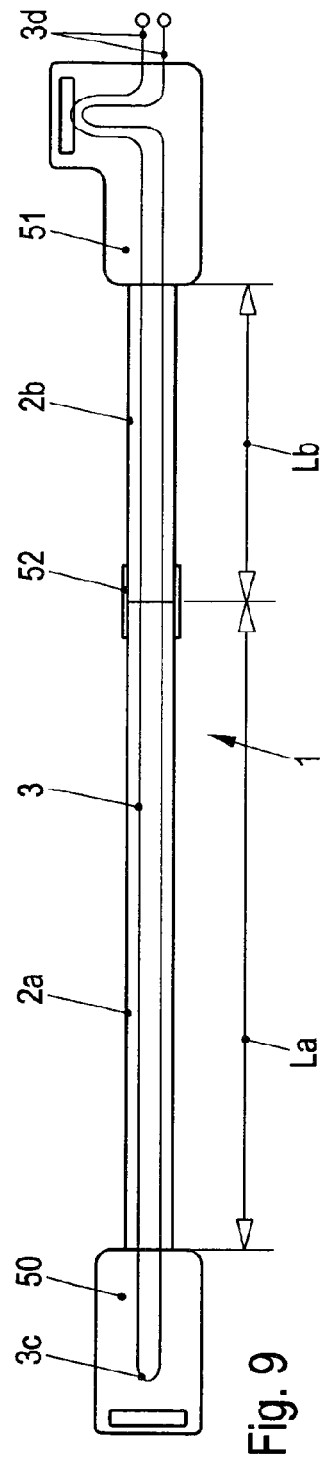
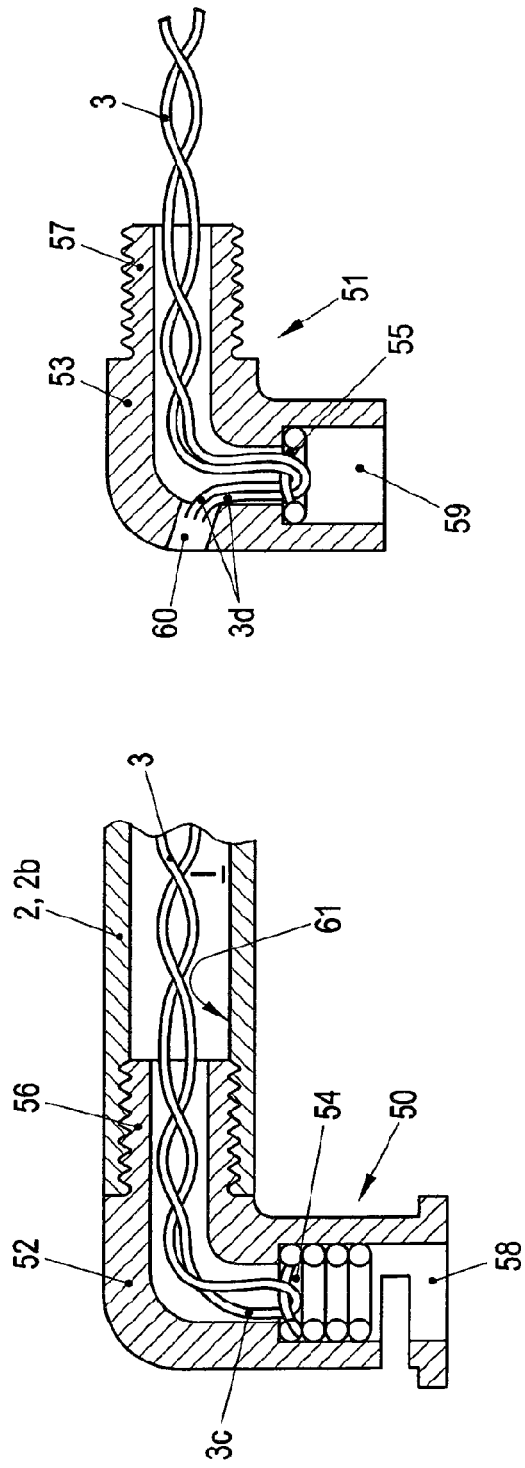

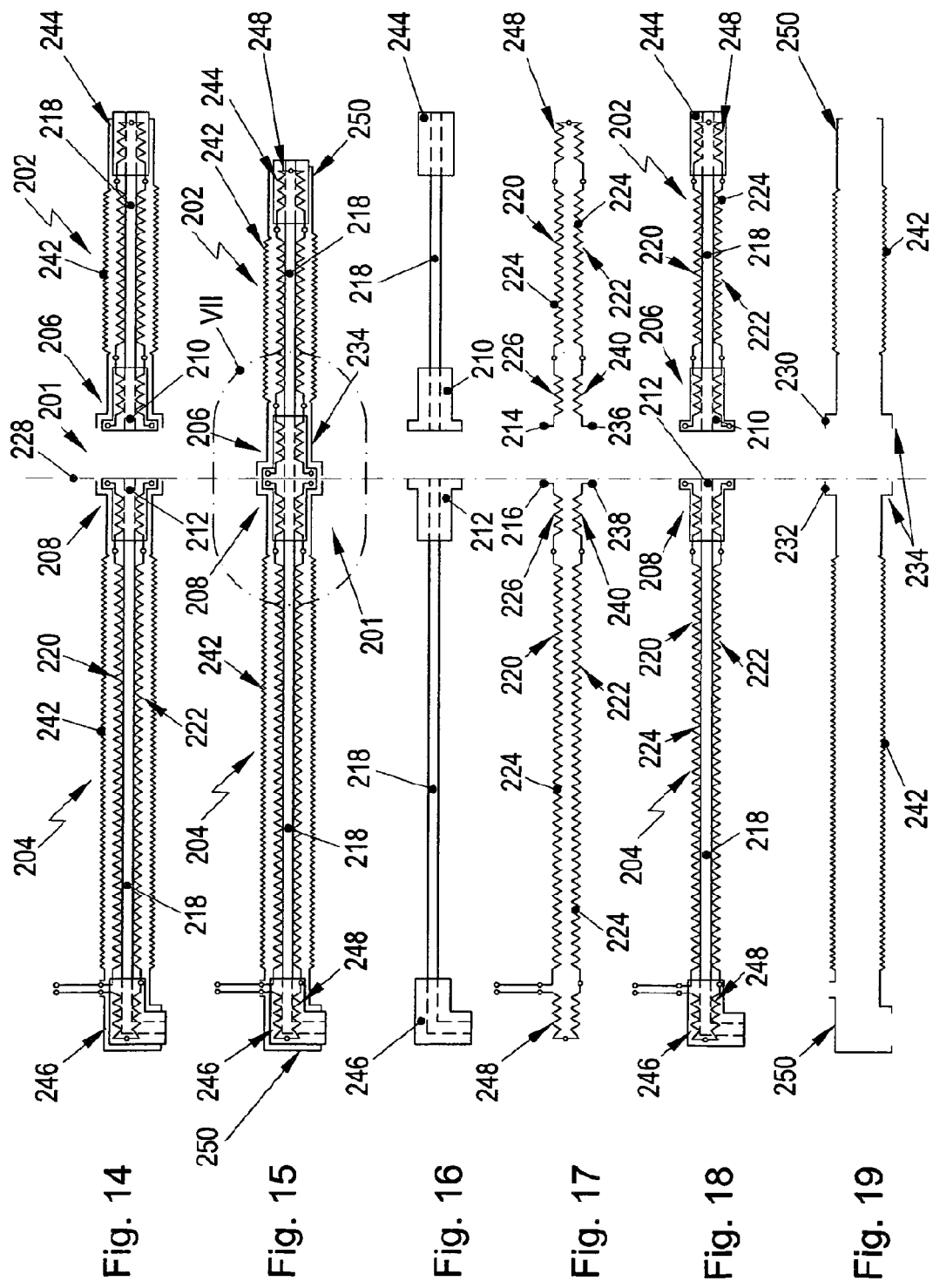

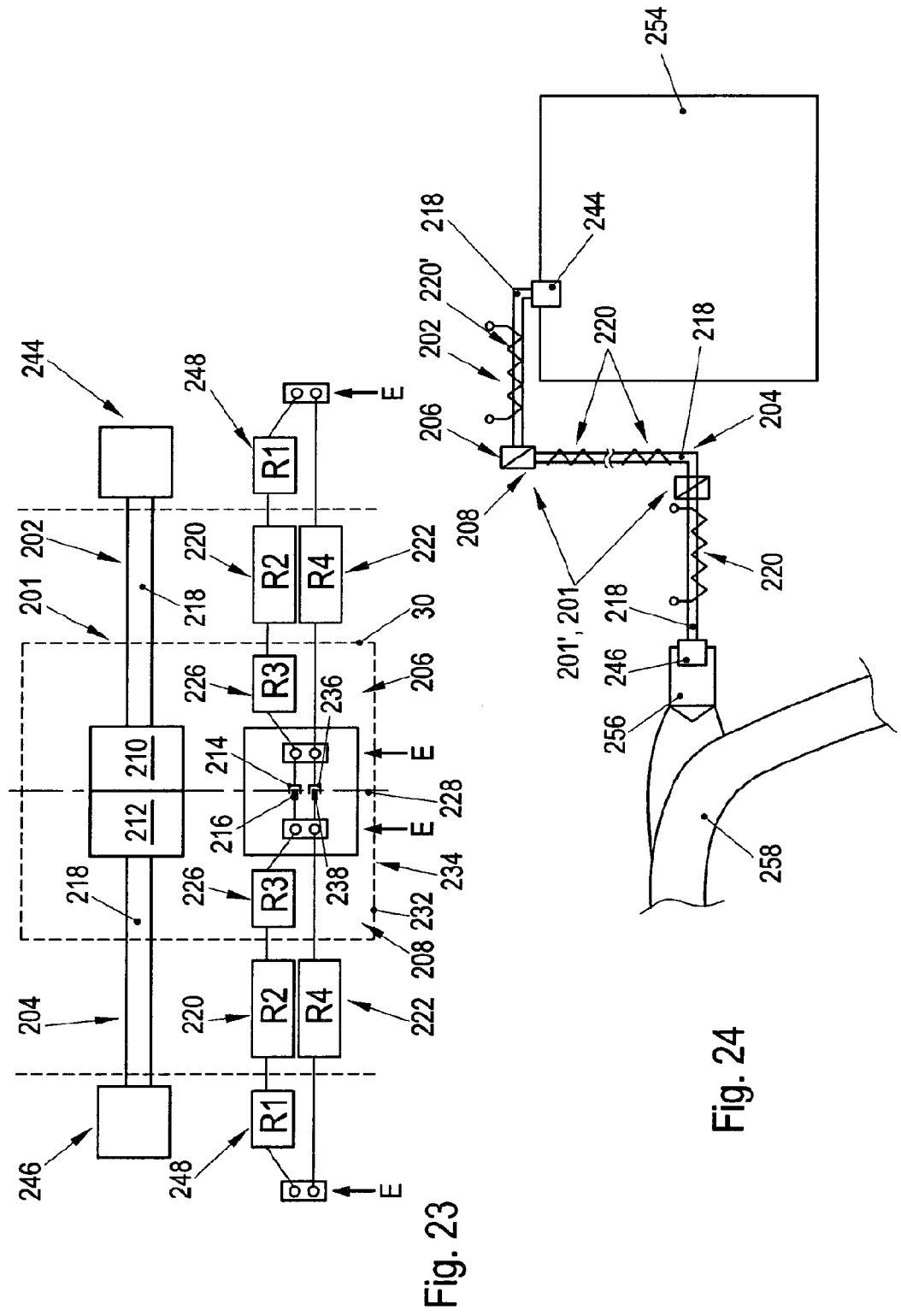

HEATABLE FLUID LINE, USE THEREOF AND METHOD FOR PRODUCING SAME

BACKGROUND

1. Field of the Invention

The invention relates to a heatable fluid line having at least one pipeline and at least one electrical heat conductor extending at least over a partial section of the length of the pipeline. The present invention furthermore relates to a method for producing an assembled fluid line of this kind and the use thereof.

2. Related Technology

The term "assembling" or "assembly" of the line as used herein with the present invention is understood to mean the final stage of manufacture of the ready-to-install fluid line, after which the line can be delivered as a fully equipped component—for, example, according to customer specifications—provided with connector parts, such as fluid coupling parts and/or line connectors, and is ready for industrial use, preferably in the motor vehicle industry.

Heatable fluid lines in various formats are known and used, for example, in fluid distribution systems of motor vehicles. The fluid can be, for example, water for a windshield washing system or an aqueous urea solution, like the one used for reduction of nitrogen oxides in exhaust SCR catalysts (SCR=Selective Catalytic Reduction). The liquid can freeze at low ambient temperatures. Fluid feeding elements, such as pumps or hoses, are therefore heated in order to prevent freezing or in order to thaw an already frozen fluid. In order to achieve this, the heatable components within the fluid system are connected via fluid lines, wherein the latter can also be electrically heated.

High demands, which are a result of the operating conditions, are placed on the heatable fluid lines in the mentioned systems. These demands especially concern the possible occurrence of high temperatures, which at certain points of the system and/or of the lines can be as high as 140° C. to 180° C., for example, and briefly also even as high as 200° C., and in addition the occurrence of high absolute pressures, which are usually within the range of 5 bar to 10 bar, sometimes also within the range of up to 15 bar, the occurrence of pressure pulses that have to be compensated, and even the occurrence of changes in volume, which are associated, for example, with the freezing under freezing conditions and subsequent thawing of the fluid. With respect to the stress variable, it can be spoken here of a so-called ice pressure resistance of the line.

A differentiation between an adaptive, either external or internal, bonding and an integrated bonding of basic embodiment variants can be made in heatable fluid lines with respect to the bonding of the heat conductor to the pipeline.

An adaptive connection, in which the heat conductor rests on the outer side of the pipeline, is described in EP 1 985 908 A1. This document relates to a line connector for media lines comprising, on the one hand, a connection piece configured with at least one terminal portion for terminal connection to a fluid line of the kind described above or configured with an assembly, and having, on the other hand, a transition portion adjacent to the terminal portions provided with a flow channel. In the region of the transition portion are provided electric heating means in an arrangement that at least partially encloses the flow channel. Problems occur with regard to the freezing resistance of the fluid line and also a limited high temperature suitability or thermal resilience during use of a pipeline made from one of the normally utilized plastic materials. The resilience of the heat conductor, usually configured as wire braid, furthermore depends from the geometry of the pipeline; the result is an increased connection expense, and the fact that pulsations cannot be sufficiently compensated.

An additional known adaptive connection, in which the heat conductor rests however in the interior of the pipeline, is described in EP 2 040 510 A1. Problems occur herein again with regard to a limited freezing resistance and high temperature characteristics and/or long-term thermal resilience and also with regard to insufficient compensation of pulsation when a standard plastic is used as material for a pipeline of the kind described above. An additional disadvantage is the absence of pipe insulation, so that the fluid line is not suitable for low temperatures within the range of less than −15° C.

Known heatable fluid lines of the kind described above with fully integrated heat conductor and pipeline are also described in DE 10 2006 051 413 A1 and DE 102 01 920 A1.

The first document relates to an electrically heatable fluid line having an interior cross sectional region enclosing a medium feeding channel, a heat conductor arrangement arranged in heat conducting connection with the interior cross sectional region, and an external cross sectional region surrounding the heat conductor arrangement. A spacer layer, which separates the heat conductor arrangement from the external cross sectional region and has a lesser mechanical stability than the interior cross sectional region and the external cross sectional region, is provided between the interior cross sectional region and the external cross sectional region. It is consequently possible to bisect the external cross sectional region and to pull it off the end of the fluid line without damaging the heat conductor.

Because the spacer layer has a comparatively lesser mechanical stability, it can also be readily removed, and specifically manually. But this known fluid line also has the problems of limited freezing resistance and a limited high temperature suitability and/or thermal resilience when used as a pipeline in which the internal and/or external cross sectional region of the pipeline is made of a technical grade plastic. A greater consumption of material is moreover required because of the multiple layer wall structure. A greater effort is required during assembly to expose the heat conductor—and thus also a greater connection effort—in comparison to the adaptive connections of heat conductor and pipeline. And in addition, an insufficient pipe insulation and a deficient pulsation compensation are disadvantages, as is also the difficulty to realize connection variants of the fluid line.

The second document relates to a flexible multilayer heatable hose with at least one reinforcing layer and one elastomeric outer layer, and also with an electric heat conductor used to heat a medium flowing in the hose. This hose is likewise to be considered as a—flexible—pipeline of the kind described above. The heat conductor extends at least over a partial section of the length of the hose and consists of a metallic core and a casing. The heat conductor is embedded outside of the outer ply of the reinforcing layer, but under or within the outer elastomer layer, and can be exposed by a radially outward acting force in order to bisect the original or weakened outer elastomer layer, but without damaging its metallic core and its casing, and can be electrically connected directly to an electrical plug connector. In this known hose there are problems with regard to the large amount of material required to ensure a sufficient wall strength, the limited potential to form variants, the deficient pipe insulation and comparatively high connection expense.

SUMMARY

It is an object of the invention to configure a heatable fluid line of the kind described above and create a method for the production thereof, which uses a less complicated mode of production, assembly or connection of the fluid line—in comparison with the known lines—and which satisfies the increasing demands with regard to resistance to high temperatures, compensation of pressure pulsations and/or ice pressure resistance. The illustrated disadvantages of the heatable fluid lines known from the prior art should be overcome at the same time.

This object is attained according to the invention in the case of a fluid line by providing the pipeline with at least two longitudinal sections configured differently with regard to the material properties and/or design thereof, namely at least one first longitudinal section consisting of a first material that comprises a first polymer and a second longitudinal section consisting of a second material that comprises a second polymer, wherein the material of the second longitudinal section is more flexible and/or has a higher resilience than the material of the first longitudinal section. Also included herein is the case where the length sections are each made entirely from the mentioned polymers.

The invention is based on the realization that the problem of the competing demands placed on the fluid line can be solved in a surprisingly simple technical manner according to the invention—as described above—by means of a heatable line configured as a hybrid component. In this case, a differentiated structuring of the line is used, that is, the different longitudinal sections of the line are structured according to the locally different prevailing requirements, wherein the second longitudinal section or several longitudinal sections formed from the second polymer-containing material ensure for the entire line the required high temperature resistance and/or compensation of pressure pulsations and also of volume changes due to the action of ice pressure. The chemical resilience, in particular the hydrolytic resilience of the fluid line according to the invention under the effect of temperature, can also be taken into account in a specific manner in the different longitudinal sections by providing it with locally different configurations. The material of the second longitudinal section can thus have a greater resilience with respect to temperature, chemical resistance and/or pressure than the material of the first longitudinal section.

In this respect it should also be mentioned that the pipeline can preferably also comprise two or more longitudinal sections made from the first polymer-containing material and/or longitudinal sections made from the second, for example, rubber-elastic and thus elongating polymer-containing material.

The second longitudinal section and/or several sections of this kind can be configured for a particular stress, such as elevated temperatures like those encountered mainly in the vicinity of an injection unit of an SCR catalyst system of a internal combustion engine of a motor vehicle and at the exhaust line from the engine, and also in order to adapt to an expanded fluid volume upon freezing and to the resulting freeze pressure. This low temperature stress occurs in an SCR catalyst system at the outlet from a fluid tank serving in the known application as a reservoir for the catalytic fluid and containing in particular an aqueous urea solution.

The material of the first longitudinal section can comprise in particular a polymer, which is a technical grade plastic, whereas the material of the second longitudinal section can comprise in particular a polymer, which is a high performance plastic.

Wherever the terms "technical grade plastic" and "high performance plastic" are used in this document, said terms refer to a common classification of plastics regarding their constant use temperature commonly used in the engineering sector. A distinction is accordingly made between mass produced plastics or standard plastics with a constant use temperature of up to 90° C., technical grade plastics with a constant use temperature of up to 140° C., and high performance plastics with a constant use temperature of more than 140° C.

The constant use temperature can be determined in various ways. A so-called temperature index is presented in the method according to UL 746B, that is, the temperature at which the polymer material still displays half of its tensile strength, its impact strength or its electrical penetration resistance after 60,000 or 100,000 hours, respectively, is determined. An analogous method is the IEC 216 (International Electrical Committee) corresponding to DIN VDE 0304. According to this method, the temperature at which the values of mechanical and electrical properties have been reduced by half after 20,000 hours is determined.

Based on these criteria, mass produced plastics are in particular polyethylene (PE), polypropylene (PP), polyvinylchloride (PVC) and polystyrene (PS). Among the technical grade plastics are polymethacrylic acid methyl ester (PMMA), polyamide (PA), polyethylene terephthalate (PET), polycarbonate (PC), acrylonitrile butadiene styrene (ABS) and polyoxymethylene (POM). Among the high performance plastics are polytetrafluoroethylene (PTFE), polyvinylidene fluoride (PVDF), polybutylene terephthalate (PBT), polysulfones (PSU), polyarylether ketones (PAEK), polyphenylene sulfides (PPS) and polyimides (PI) and also various copolymers which jointly contain the smallest repeating chain structural units of the above-mentioned compounds. Since these premium polymers are very complicated to produce and are consequently expensive, their use is restricted to certain specific cases. For this reason, these materials are also not used for the production of known fluid lines despite their excellent performance spectrum.

A first longitudinal section of the pipeline containing a technical plastic, made in particular entirely from this plastic, can be produced very economically and can thus be employed especially in greater length—or in greater length compared to the second longitudinal section—within a motor vehicle.

As polymer material of the first longitudinal section in this case a polyamide (PA), in particular PA 6, PA 66, PA 11 or PA 12 can be used to advantage, such that a low-cost production of the invented fluid line can be ensured with respect to overall consumption of materials. The first longitudinal section can be configured herein, for example, as a shaped plastic tube, wherein filled technical grade plastics, such as fiber reinforced plastics, can also be used in order to ensure an increased stability.

Polyamides are a very extensive polymer class whose individual representatives are produced in different ways. They characteristically have functional amide groups—CO—NH— or even—CO—NR— in the macromolecule, wherein R stands for an organic radical. Reference is made to DIN Standard EN ISO 1043-1 with respect to the designations and abbreviations of the polyamides using the letters "PA" and the following combinations of letters and numbers. Accordingly, polyamides derived from aminocarbonic acids of the type $H_2N—(CH_2)_x—COOH$ or from the corresponding lactams, are designated as PA Z, wherein Z denotes the number of carbon atoms in the monomer (Z=x+1). Thus, PA 6 represents, for example, a polymer produced from ε-caprolactam or ω-aminocapronic acid $[NH—(CH_2)_5—CO]_n$. PA 11 is produced from 11-aminoundecanic acid and PA 12 is produced from ω-aminodecanoic acid.

PA 11 and PA 12 are cold resistant down to at least −50° C., and are rated heat resistant up to at most +80° C. The cold and/or heat resistance can be improved, however, to values of −60 C and +110 C, respectively, and briefly up to 160° C., by using stabilizers and softeners. PA 12, for example, is commercially available under the trade name of VESTAMID® L. This material displays a very low water absorption and molded parts produced from it exhibit merely the slightest dimensional changes under alternating ambient moisture. PA 12 has an exceptionally high impact resistance and notched bead impact resistance even far below the freezing point. It furthermore exhibits good to very good chemical resistance to greases, oils, fuels, hydraulic fluids, numerous solvents as well as salt solutions and other chemicals.

Polyamides, which can be derived from diamines and dicarbonic acids of the $H_2N-(CH_2)_x-NH_2$ and $HOOC-(CH_2)_y-COOH$ types, are designated as PA Z1Z2, wherein Z1 denotes the number of carbon atoms in the diamine and Z2 denotes the number of carbon atoms in the dicarbonic acid (z1=x, Z2=y+2). PA 66, for example, represents the polymer from hexamethylenediamine and adipic acid, $[NH-(CH_2)_6-NH-CO-(CH_2)_4-CO]_n$.

Even though the production process for the two most frequently used polyamides PA6 and PA66 is fundamentally different, PA6 and PA66 are chemically and physically very similar and differ merely through a mirror-image arrangement of one $-CH_2-NH-CO$ group. PA6 and PA66 are cold-resistant down to at least −30° C. and have a rated heat resistance up to a maximum of 105° C., and PA 66 up to maximum of 120° C., respectively.

The polymer of the second longitudinal section can be preferably an elastomer, for example, hydrated acrylonitrile butadiene rubber (HNBR), ethylene propylene diene rubber (EPDM) for a temperature stress of up to 170° C., an ethylene propylene rubber (EPM) for a temperature stress above 200° C., or even a thermoplastic elastomer (TPE).

PA 12 elastomers appear to be particularly suitable among this class of materials. They are block copolymers of PA 12 and polyether segments (polyether block amides PEBA). They exhibit the essential properties of PA12 and the elastomer character becomes increasingly more pronounced with increasing polyether content. The polymers become more elastically flexible and resistant to cold impact.

The second longitudinal section can thus be configured as a more flexible hose—when compared to the first longitudinal section—for greater stress, in particular higher temperatures and/or greater internal pressure, and can be produced from a rubber-elastic, in particular multiple layer, for example, fabric-reinforced material. Pressure resistant materials for a reinforcement of this kind and for temperatures within the range between about 150° C. to 180° C. can be preferably fabrics of aromatic polyamide fibers (Aramid), which are known, for example, under the trade name Kevlar®, and fabrics made of carbon fibers can be employed for even higher temperatures.

As high performance plastics can mainly be used fluoropolymers, such as polytetrafluoroethylene (PTFE), ethylene tetrafluoroethylene (ETFE), perfluoroethylene propylene (FEP), polyarylene ether ketones (PEAK), such as polyphenylenes, for example, poly[di-(oxy-1,4-phenylene)carbonyl-1,4-phenylene] (polyether ether ketone, PEEK), poly[oxy-1,4-phenyleneoxy-di-(1,4-phenylenecarbonyl-1,4-phenylene] (polyether ether ketone ketone, PEEKK) or poly[oxy-1,4-phenylenecarbonyl-1,4-phenyleneoxy-di-(1,4-phenylenecarbonyl)-1,4-phenylene] (polyether ketone ether ketone ketone, PEKEKK), or even polyarylene sulfides, such as polyphenylene sulfide (PPS).

Concerning the material PTFE, it displays an excellent thermal resilience. No notable decrease occurs until temperatures above 350° C. are reached. The upper constant use temperature is at 250° C. PTFE differs fundamentally, however, from the melt behavior of other polymers in that it changes from a white crystalline material into a transparent, amorphous substance at temperatures within the range between 325° C. and 340° C. during the course of an increase in volume of about 30 percent, and retains its shape even at temperatures above 400° C. Special techniques, for example, the production of extrudable and subsequently sinterable pasty materials, which can contain fillers and plasticizers in addition to the PTFE particles, and other polymers, for example, polyamides, as in the case of the production of compounds, must be applied for this reason in order to produce tubes and hoses. However, application of a PTFE coating, in particular an interior coating of the pipeline in its second—and if necessary also in the first—longitudinal section of the pipe, is less complicated.

Particularly preferred as possible polymer materials for the second longitudinal section are polyphthalamides (PPA), especially high temperature polyphthalamides (HT-PPA). These belong to a group of polyamides produced from the aromatic monomers terephthalic and isophthalic acids ($HOOC-C_6H_4-COOH$) and hexamethylenediamine (6 C atoms) and they have the highest temperature resistance among the polyamides. The constant heat resistance is within the range of between about 150° C. and a maximum of 160° C. The moisture absorption is within the range of only about 0.1 percent to 0.3 percent.

One representative of the polyamide group mentioned above designated as PA Z1 Z2 is also known as PA 612, for example, and is commercially available under the trade name of VESTAMID® D. This polyamide is the polycondensation product of 1,6-hexamethylene diamine and 1,12-dodecane-di-acid. Even if the concentration of carbonamide groups in PA 612 is slightly greater than in polyamide 12, it is still far lower than for PA 6 or PA 66. Parts made from PA 612 thus have the almost unchanged above-named advantageous properties of PA12. However, PA 612 has the added advantage in comparison to PA 12 of a nearly 40° C. higher melting point and thus a better shape stability under heat. The constant heat resistance is within the range of about 130° C. to 140° C. Even the restoring elasticity of PA 612 with high wet resistance is greater than for PA 12. PA 612 can thus be used positively as a polymer in the material of the second longitudinal section.

Regarding this, it should be mentioned that according to the invention, other polymers having a constant heat resistance within the range of about 130° C. to 140° C. are subsumed under the term of "high performance polymers" and—as is already indicated from the discussion above—a high heat resistance is not the sole criterion for the suitability of a material as polymer for the second longitudinal section of the pipeline. However, the mentioned high performance plastics is a majority feature a greater resiliency than the technical grade plastics, not only with respect to the maximum temperature, but also with respect to the minimum temperature, the chemical resistance and/or the pressure.

Given an application of the invented heatable fluid line in an SCR catalyst system, it can be a particular advantage to subdivide the entire fluid line between the tank and the injection device into at least three longitudinal sections, wherein shorter longitudinal sections containing the second polymer-containing material are arranged in the vicinity of the tank and in the vicinity of the injection device, and wherein the central longer longitudinal section of the line contains the first polymer-containing material.

The longitudinal sections can be undetachably interconnected, on the one hand—that is, that can only be separated by destroying them. But there is also the advantageous possibility, on the other hand, that the longitudinal sections are interconnected in a detachable manner, especially by means of one connection arrangement each, which consists of two coupling parts, each of which features one of two corresponding interconnectable fluid coupling parts and each connected to one of the two longitudinal sections to be joined, and also each having at least one electric plug connecting part, so that the fluid coupling parts and the electric plug connector parts can be jointly, that is, simultaneously, interconnected or disconnected from each other by joining or separating the two coupling parts.

In a fluid line according to the invention, the heat conductor can be connected adaptively, being placed either resting on the inside or also on the outside against the pipeline. With an arrangement of this kind, the advantages for installation of the wire braid are that the formation of variants is not dependent upon the extrusion process of the pipe and that the wall thickness of the pipe can be selected independently from the conductor. Advantageous simple adaptations of length and resistance are possible in this way; for example, a different braid pitch can be used in short lines than the one used in long lines. The effort needed to expose the braid is also small compared to integrated embodiments like those described above. Finally, a small connection effort is needed for attachment of connectors in an advantageous manner.

In accordance with the method specified in the invention for producing of an assembled heatable fluid line of the kind described above, in particular a fluid line according to the invention, it is provided that a pipeline strand is first wound continuously with the at least one heat conductor, whereupon initially the intermediate product prefabricated in this manner is cut into fluid line segments, each of which features overlong sections at its end side, which are dimensioned in such a way that the heat conductor can be unwound from each of these overly long sections by a length that makes possible a winding of the heat conductor on a fluid coupling and/or connecting part or the housing thereof, whereupon after unwinding of the overlong section from the particular heat conductor, said overlong section is separated from the fluid line piece, the resulting pipeline end is connected to the fluid coupling and/or connecting part or the housing thereof, and the fluid coupling and/or connecting part or the housing thereof, is wound at least in part with the heat conductor.

In other words, a strand of heat conductor (or even two or more heat conductors) is wound virtually as an "endless line" around the pipeline and thereafter the heat conductor(s) is/are covered with an encasing element, in particular in the form of at least one screw-shaped winding of a self-adhesive tape and/or of a corrugated tube. For production of the line according to the invention, the pipeline strand can be formed at the same time from the at least two length sections, which are configured differently with regard to their material and performance characteristics and are preferably permanently joined together. A still unassembled intermediate product is thus obtained. For the assembly step, that is, for connecting with at least one connection part, preferably with two connection parts, the intermediate product is then cut into fluid line segments having a certain excess length. The excess length is dimensioned in such a way that the heat conductor(s) can be wound from the end sections of the fluid line segments over a length that is such that these wound heat conductor ends can be wound subsequently on the particular connection part. The protruding ends of the pipeline "released" from the heat conductors and designated as overly long sections are then cut off as "waste." The free ends of the pipeline can now be joined to the connection part, for example, to a coupling part and/or to a line connector. As a result of this advantageous procedure according to the invention, the heat conductors have a consistent profile across the entire length of the fluid line—especially including also the connector parts—with no interruptions, and thus also without additionally needed heat conductor connecting parts, such as crimp connectors between a separate section of the heat conductor on the pipeline and a separate heat conductor section on the connecting part. As a result of the small amount of waste, the method according to the invention is especially recommended for the length sections of a fluid line according to the invention, which are produced from technical grade plastic.

The assembly of a fluid line according to the invention can also take place, however, if necessary, in a known manner, that is, through discontinuous winding of line segments joined to connectors. A simultaneous adaption of the wire braid to several components can thus keep the connection expense low.

Additional advantageous embodiment features of the invention are found in the dependent claims and also in the following description.

BRIEF DESCRIPTION OF THE DRAWINGS

The invention will be explained in greater detail below based on preferred exemplary embodiments, wherein:

FIG. 9 shows a schematic representation of yet another configuration of a heatable fluid line according to the invention;

FIGS. 10 and 11 show two preferred embodiments of connector parts, especially line connectors, shown in longitudinal cross section, of a heatable fluid line according to the invention;

The same parts are always identified with the same reference characters and thus, as a rule, will only be described once each in FIGS. 1 to 13 of the drawings.

Figure 1:
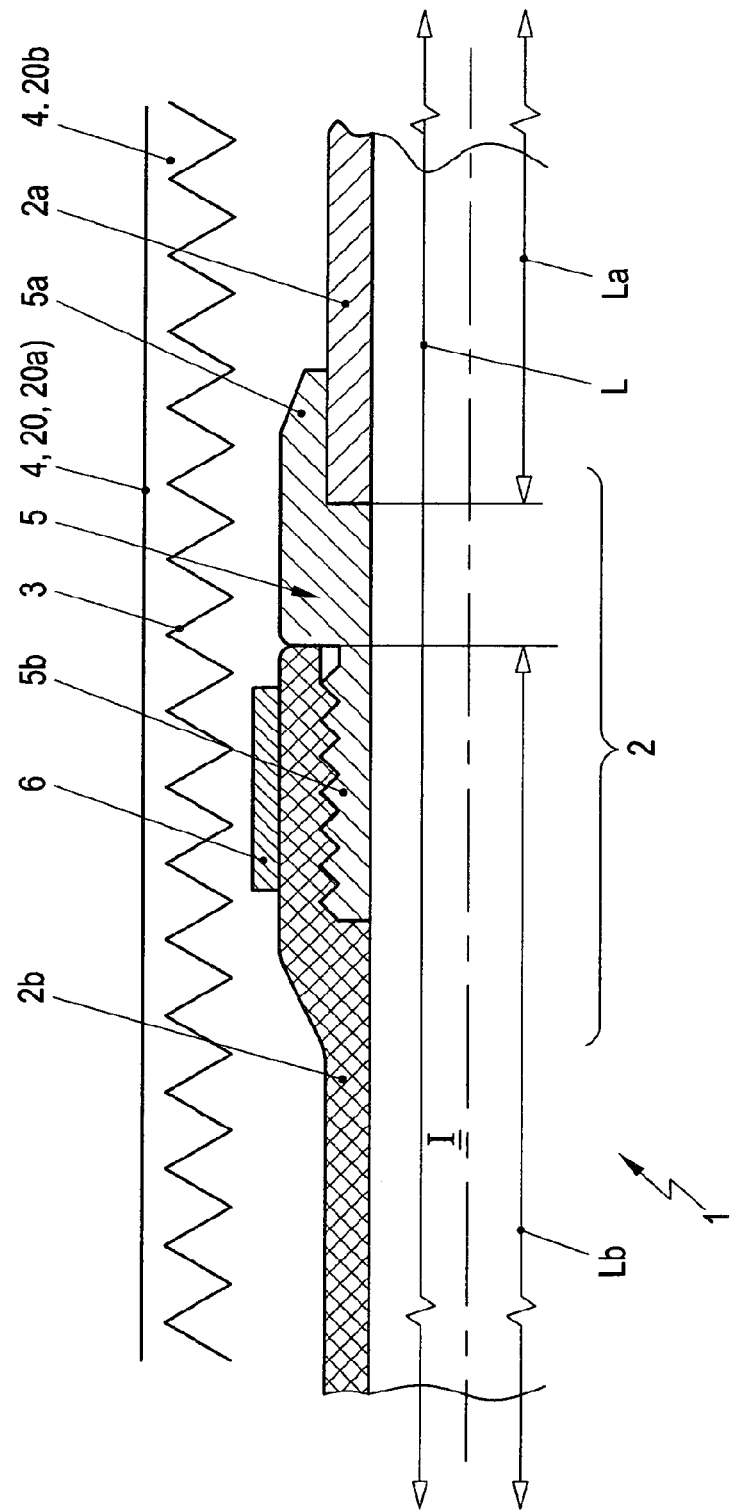
FIG. 1 shows line segment of a first configuration of a heating fluid line according to the invention in a representation cut in half across its axial length.
Figure 4:
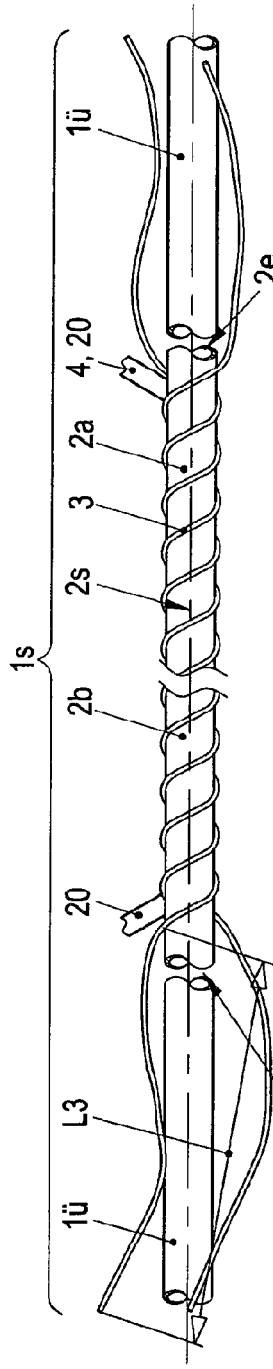
Figure 20:
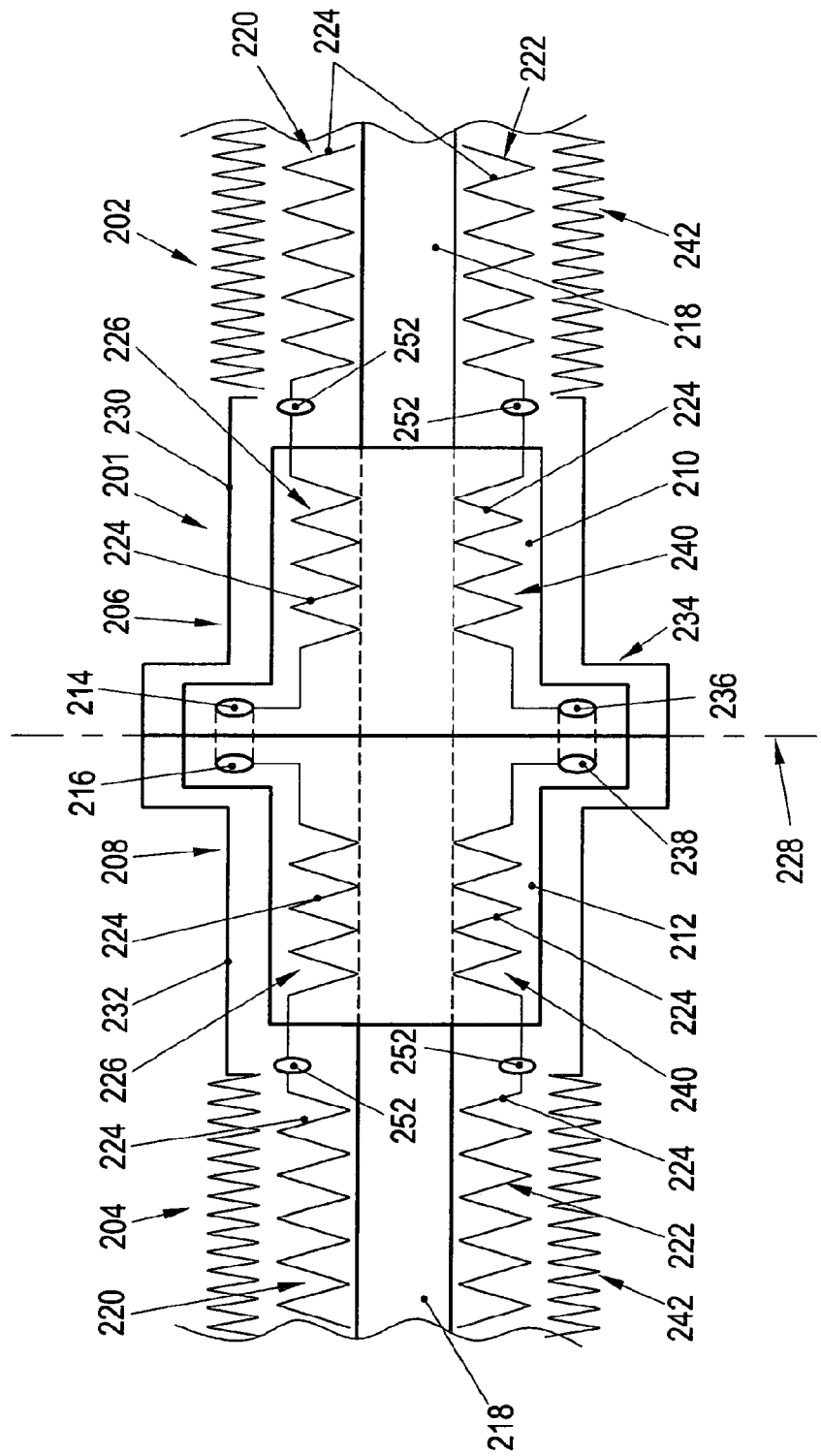
Figure 21:
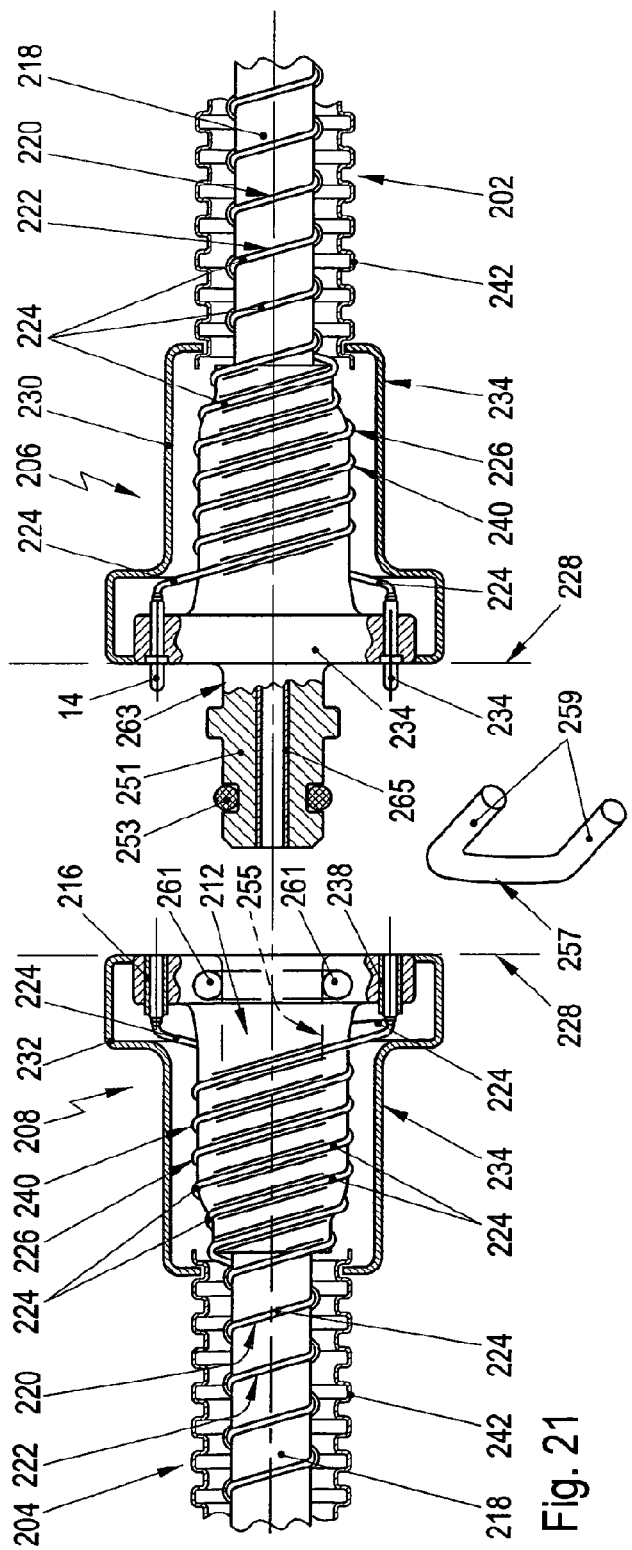
Figure 22:
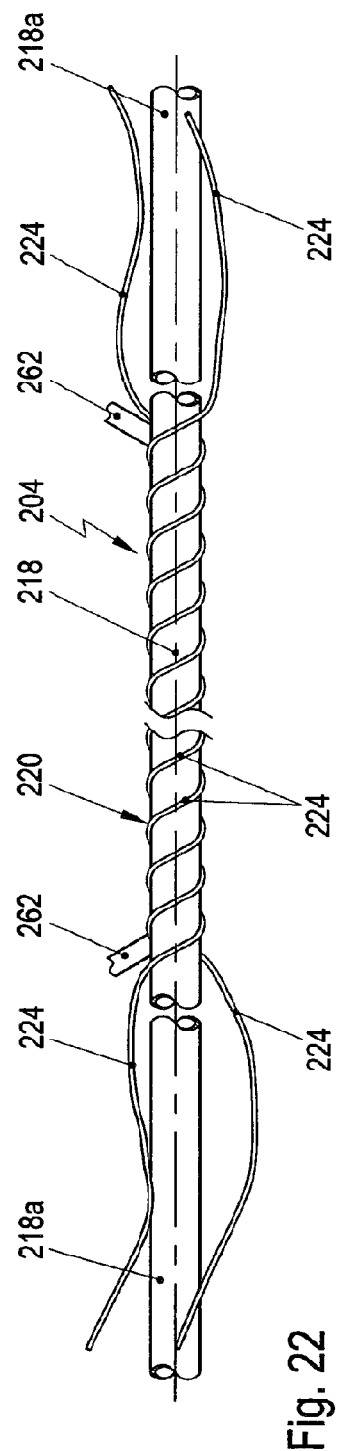

The technical emphasis of the illustrative FIGS. 14 to 24 resides in the embodiment of a connecting arrangement according to the invention to be preferably used in a fluid line according to the invention. This connecting arrangement has its own independent inventive importance. Again, the same parts are identified with the same reference characters—but differently from FIGS. 1 to 13—in FIGS. 14 to 24, and thus will only be described once in the description of the corresponding figures. In these figures:

FIG. 14 shows a highly schematized representation of a longitudinal cross section of two assembled heatable length sections of a fluid line according to the invention with a connection arrangement to be used preferably according to the invention shown in a decoupled state before or after the connecting step;

FIG. 15 shows the same arrangement as FIG. 14, but showing the coupled state of the connection arrangement according to the invention;

FIGS. 16 to 19 show separate representations of individual components of the overall arrangement according to FIG. 14;

FIG. 20 shows an enlarged section of FIG. 15 showing region VII of the connection arrangement;

FIG. 21 shows a concrete exemplary embodiment of the connection arrangement in decoupled state similar to FIG. 14;

FIG. 22 shows, similarly as FIG. 4, an abbreviated side view of a heatable fluid line in a state during its production, in order to illustrate one advantageous production method;

FIG. 23 shows a connection arrangement depicting a schematic diagram as a kind of block diagram of an advantageous configuration and the interconnection of the electrical heating elements; and FIG. 24 shows a schematic diagram of a preferred application of the connection arrangement.

DETAILED DESCRIPTION

With regard to the preceding and in particular the following description, it is expressly emphasized that the invention is not limited to the exemplary embodiments and also not to all or several features of the described feature combinations, but rather each individual partial feature of the/each exemplary embodiment—for example, a parameter range stated as being advantageous for a particular material—can also have inventive importance per se, even detached from all other partial features described in connection therewith and also in combination with any other features of another exemplary embodiment.

As is evident at first from FIG. 1, a heatable fluid line 1 according to the invention features now a pipeline 2 and at least one electrical heat conductor 3 extending over at least a partial section of the length L of the pipeline. The heat conductor 3—which can be in particular a wire braid—is illustrated in a highly simplified form as a zigzag line. The heat conductor can be preferably wound in a screw-shaped line around the mantle surface of the pipeline 2 or can also be passed through the interior I of the pipeline 2. The heating braids may require temperature resistant materials for their casing, and fluoropolymers appear to be particularly useful for this.

In one advantageous embodiment of the fluid line 1 according to the invention, the pipeline 2 is encased by means of a line casing 4, which is only shown schematically, together with the heat conductor 3. This line casing 4—as will be explained in greater detail below—can preferably consist of a self-adhesive tape 20 or corrugated tube 20a, or in part of a self-adhesive tape 20 and in part of a corrugated tube 20a. The self-adhesive tape 20 is used herein solely as reinforcement, whereas the corrugated tube 20a performs primarily a protective and insulating function. An insulation can furthermore be provided, for example, in the form of a gap 20b, between the pipeline 2 and corrugated tube 20a, which may be filled with additional insulating material as needed.

The pipeline features at least two longitudinal sections 2a, 2b. The first longitudinal section 2a has a length La, the second longitudinal section 2b has a length Lb. The two longitudinal sections 2a, 2b according to the invention have a different configuration with regard to their material and performance characteristics.

Regarding the constructive embodiment, in particular the geometric characteristics of the pipeline 2, the latter can in general have a circular cross section, wherein the cross section of the pipeline 2 according to the invention can deviate initially from the circular shape, in that it is configured, for example, in oval shape.

The first longitudinal section 2a consists of a first polymer-containing material containing a technical grade plastic, that is, a plastic with a constant use temperature of between 90° C. and 140° C. This also means that the material can consist exclusively of this plastic. The material of the first polymer-containing material can be preferably a polyamide, in particular PA 11 or PA 12. The first longitudinal section 2a therein can be preferably configured as a molded plastic tube, wherein a polymeric plastic reinforced with special fillers, for example, can be used.

Similar materials can also be used for a corrugated tube 20a that forms the line casing 4. However, it is subjected to less mechanical stress, so that likewise lesser demands can be placed on the material quality and possibly also mass produced plastics can be employed herein. The corrugated tube 20a can thus be made of a technical grade plastic or can be made at least in part—in longitudinal sections under greater temperature stress, such as the second longitudinal section 2b of the pipeline—of high performance plastic. The use of a flexible material for the corrugated tube 20a is also advantageous.

The second longitudinal section 2b consists of a second polymer-containing material, which is more flexible than the first material and/or is a high performance plastic, that is, a plastic with a constant use temperature of over 140° C. As was already mentioned, the second polymer-containing material can contain a fluoropolymer, such as PTFE, a polyarylene ether ketone, such as PEEK, or a polyarylene sulfide, such as PPS. This also means that the material can consist exclusively of this polymer. However, the longitudinal sections 2a, 2b, preferably the second longitudinal section configured like a hose, can also contain additional material components in addition to the particular polymer. For example, they can be configured as multiple layers reinforced, for example, with a fabric. EPDM or EPM can be used in particular as elastomeric material—in the case of a flexible hose-like configuration of the pipeline—as polymer for the second longitudinal section 2b.

According to the embodiment of FIG. 1, the invention provides that the different longitudinal sections 2a, 2b are permanently attached together. An adapter part 5 is provided at the connection point of the sections. This adapter 5 can be configured preferably as a technical grade plastic to economize on materials, or can even be conductive, for example, stainless steel. It can also be encased in a heat conducting casing (which is not illustrated).

In the illustrated embodiment, the adapter 5 features a welded connector 5a at one end for connection to the first longitudinal section 2a—configured in particular as plastic tube—and a spindle profile 5b at the other end for connection to the second longitudinal section 2b configured in particular as a hose. The hose is additionally secured to the spindle profile 5b by means of a crimp casing 6. The adapter 5 could also be configured in such a way that a flaring or welding is possible on both sides, especially a laser welding to the longitudinal sections 2a, 2b. In the event that the heat conductor 3 is guided through the interior I of the pipeline 2 for interior heating, the adapter 5 should be free of any back-cut at least on one side in order to not restrict the passage of the heat conductor 3 through the interior I of the pipeline during assembly.

Figure 2A:
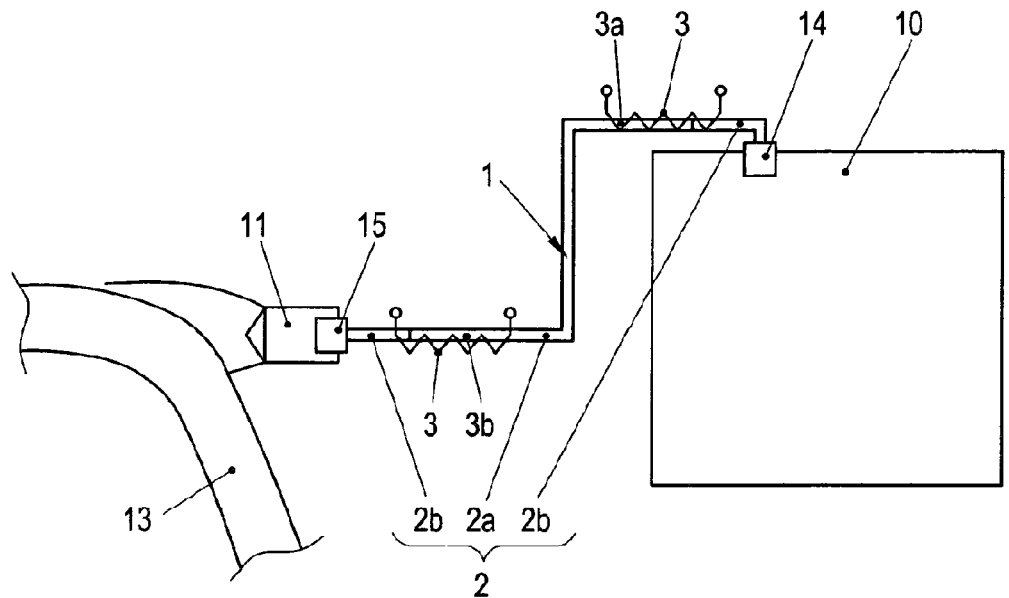
FIGS. 2a and 2b show a schematic diagram of two variants of a preferred use of the heatable fluid line according to the invention.

FIG. 2a presents a first variant of a preferred use of the fluid line 1 according to the invention. It relates to an SCR catalyst system of an internal combustion engine of a motor vehicle, wherein a fluid tank 10 is to be connected to an injection unit 11, which injects the fluid, in this application an aqueous urea solution, for selective catalytic reduction of nitrogen oxides into an exhaust line 13 of the internal combustion engine (which is not illustrated).

The distance between the tank 10 and the injection unit 11 is bridged herein by using a fluid line 1 according to the invention. The invention provides that the entire line connection between the tank 10 and the injection unit 11 is divided into three sections, wherein "second" longitudinal sections 2b made from the polymer-containing material, which is, for example, rubbery, elastic and flexible and/or contains a high performance plastic, are arranged in the vicinity of the tank 10 and in the vicinity of the injection unit 11. In between is arranged a "first" longitudinal section 2a made from a polymer-containing material containing a technical grade plastic. The central longer line segment thus consists of a low cost material, whereas a premium material, especially material suitable for higher temperatures and/or higher pressure, is used for the outer shorter line segments. The longitudinal sections 2b, 2a, 2b are joined together in an undetachable manner, for example, as described above with reference to FIG. 1. At the ends of the line 1 is provided a connector part (fluid coupling part 14) to the tank 10 and a connector part (fluid coupling part 15) to the injection device 11. A heating of the fluid line 1 by means of a heat conductor 3 takes place in two different partial regions 3a, 3b on the pipeline 2.

Figure 2B:
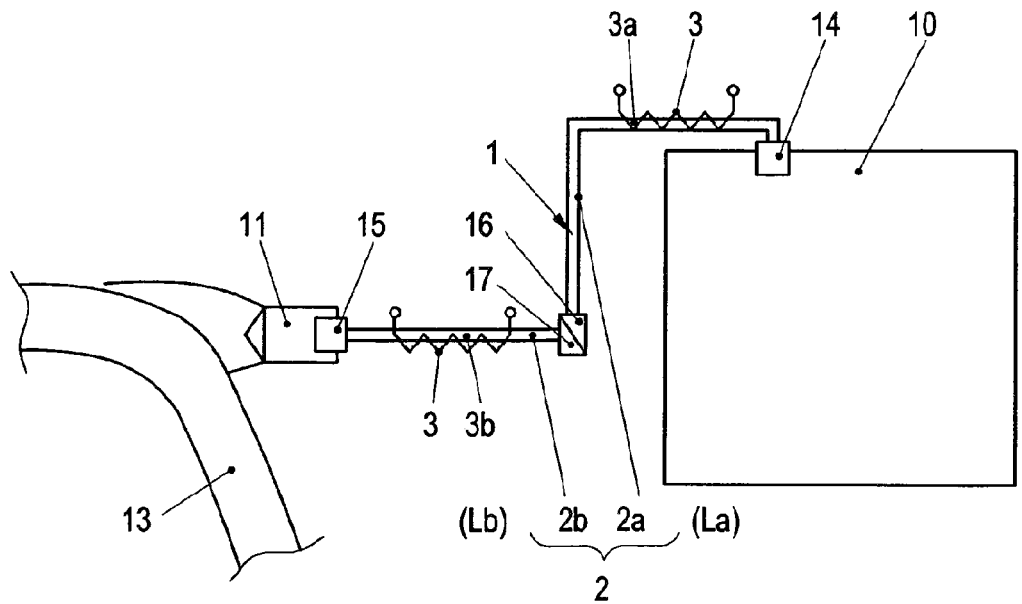

In FIG. 2b is illustrated a second variant of a preferred use of the fluid line 1 according to the invention. It differs in essence very little from the first variant. The distance is bridged here too between the tank 10 and the injection device 11 of an SCR catalyst system of a motor vehicle internal combustion engine by using a fluid line 1 according to the invention. It is provided herein, however, that the line connection between the tank 10 and the injection device 11 is divided into only two sections, wherein the first longitudinal section 2a—made from the polymer-containing material containing a technical grade plastic—is arranged in the vicinity of tank 10, and the second longitudinal section 2b made from the more flexible material and/or the polymeric material containing a premium plastic is arranged in the vicinity of the injection device 11 is. The longitudinal sections 2a, 2a are joined together in a detachable manner by means of a fluid coupling part 16 at the end of the first longitudinal section 2a and a complementary fluid coupling part 17 at the end of the second longitudinal section 2a, which are located in the vicinity of the injection device 11.

This variant is particularly advantageous with regard to the ease of assembly. Of course, the tank 10 will in all probability be installed first in this kind of system. In order to do so, it is advantageous to connect the tank 10 before or during assembly to the first longitudinal section 2a of the fluid line 1, which can be realized via the line connector 14, whose one end rests against the first longitudinal section 2b. The tank connection is often no longer accessible during the subsequent assembly of the vehicle. The injection device 11 can nevertheless still be connected via the already assembled first longitudinal section 2a of the fluid line in a simple and fast manner via the second longitudinal section 2b of the fluid line 1, in that merely the fluid coupling parts 16, 17 have to be interconnected. This kind of division of the line connection between the tank 10 and the injection device 11 thus facilitates the assembly of parts within the vehicle.

The longitudinal sections 2a, 2b of the fluid line 1 have different lengths in the two preferred applications. The length Lb of the second shorter longitudinal section 2b or the sum of the longitudinal sections 2b made from the second polymeric material can amount to preferably a maximum of 20 percent of the length La of the first longer longitudinal section 2a, or if necessary, of the sum of several longitudinal sections 2a made from the first polymeric material and/or at least 200 mm to 500 mm with a view toward an economical consumption of materials.

The connector parts 14, 15 and the fluid coupling parts 16, 17 can be produced from a technical grade or from a high performance plastic, or from metal. But the connector part 15, in particular a so-called QC "Quick Connector" on the hot side of the exhaust line 11, should be produced from metal, for instance, stainless steel, due to the likewise required resistance to catalyst solution.

The various steps of the method according to the invention for production of an assembled, in particular a heatable, fluid line according to the invention, are illustrated in FIGS. 3 to 6.

Figure 3:
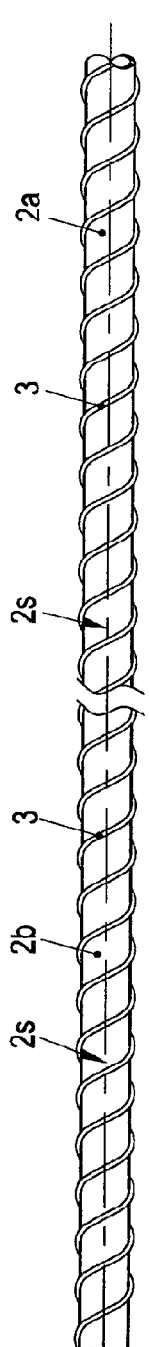
FIGS. 3 to 6 show various steps of the method according to the invention for producing of an assembled, in particular, heatable fluid line according to the invention.

As is shown in FIG. 3, the method provides that first a pipeline strand 2s is wound continuously with the at least one heat conductor 3 and thereafter the heat conductor 3 is covered with a line casing. The latter is already shown in FIG. 4.

In FIGS. 3 and 4 on the right is shown a pipeline strand 2s made from the material used for forming the first longitudinal section 2a, and on the left is shown a pipeline strand made from the material for forming the second longitudinal section 2b.

The line casing 4 can first be produced—as shown—for example, by means of a screw-like winding of the pipeline strand 2s with a self-adhesive tape 20.

FIG. 4 also shows that the intermediate product prefabricated in this way is cut into fluid line segments is having overly long sections 1u on the terminal sides thereof, which are dimensioned in such a way that the heat conductor 3 can be unwound from each of these overly long sections 1u by a length L3, which makes possible a winding up of the heat conductor 3 on a connector part 21, 22. A braid reservoir is produced in this way for winding the particular connector part 21, 22, so that the latter can later be heated, should it be necessary. Connector parts 21, 22 of this kind are illustrated in FIG. 5.

After the unwrapping of the mentioned length L3 of the heat conductor 3 from the overly long section 1u, this overly long section 1u is separated from the fluid line segment 1s. This is already shown in FIG. 4. The resulting pipeline end 2e is then connected to the connector part 21, 22, and the connector part 21, 22 is wrapped with the heat conductor 3. The braid reservoir formed by the unwrapped length L3 of the heat conductor is now applied on the connector 21, 22, wherein this can be done, for example, by means of molding elements (not provided with numerals) and/or by means of a self-adhesive tape. The open ends of the braid are closed off (right side in FIG. 5) and/or a connection to a refrigerant line is produced. Crimps 24 can be used for this purpose.

Figure 6:
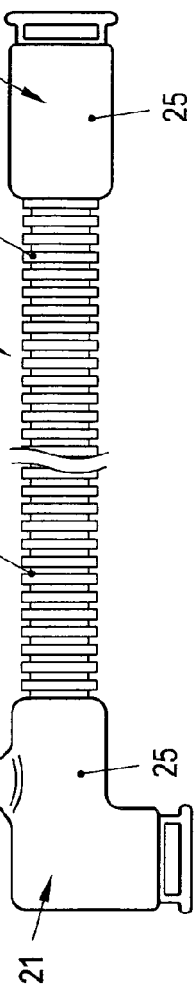

Protective caps 25 and—as shown in FIG. 6—electric plugs 26 are finally assembled on or at the connector parts 21, 22.

Figure 5:
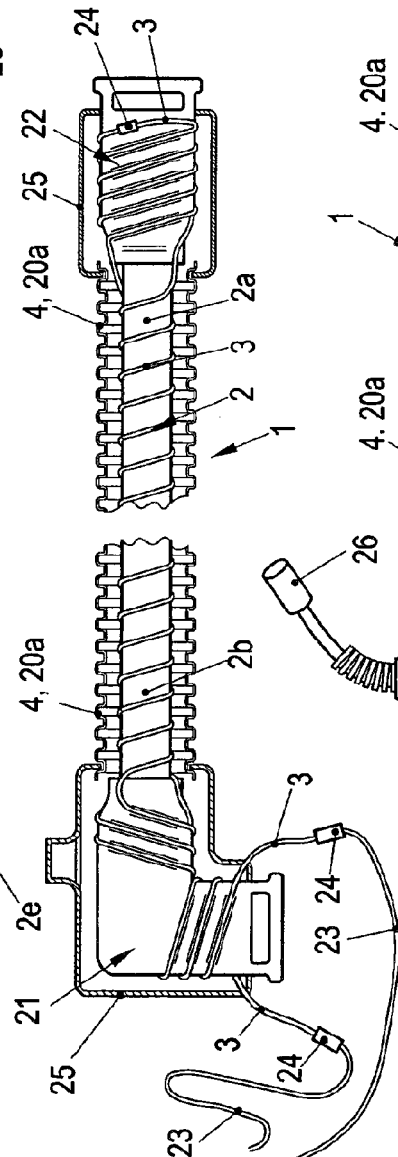
Figure 7:
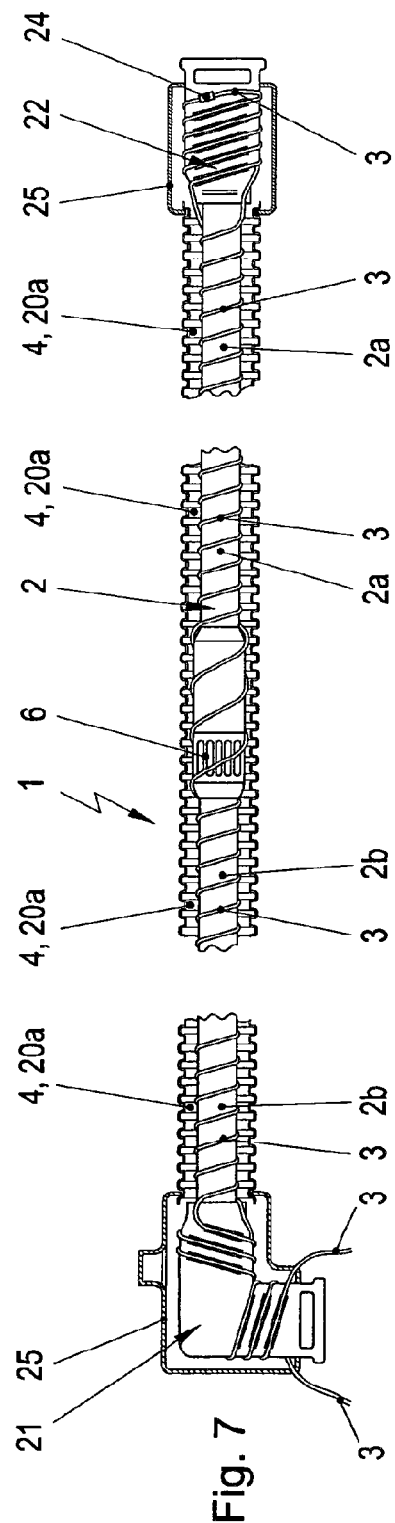
FIGS. 7 and 8 shows two additional configurations of a heating fluid line according to the invention depicted in longitudinal cross section.
Figure 8:
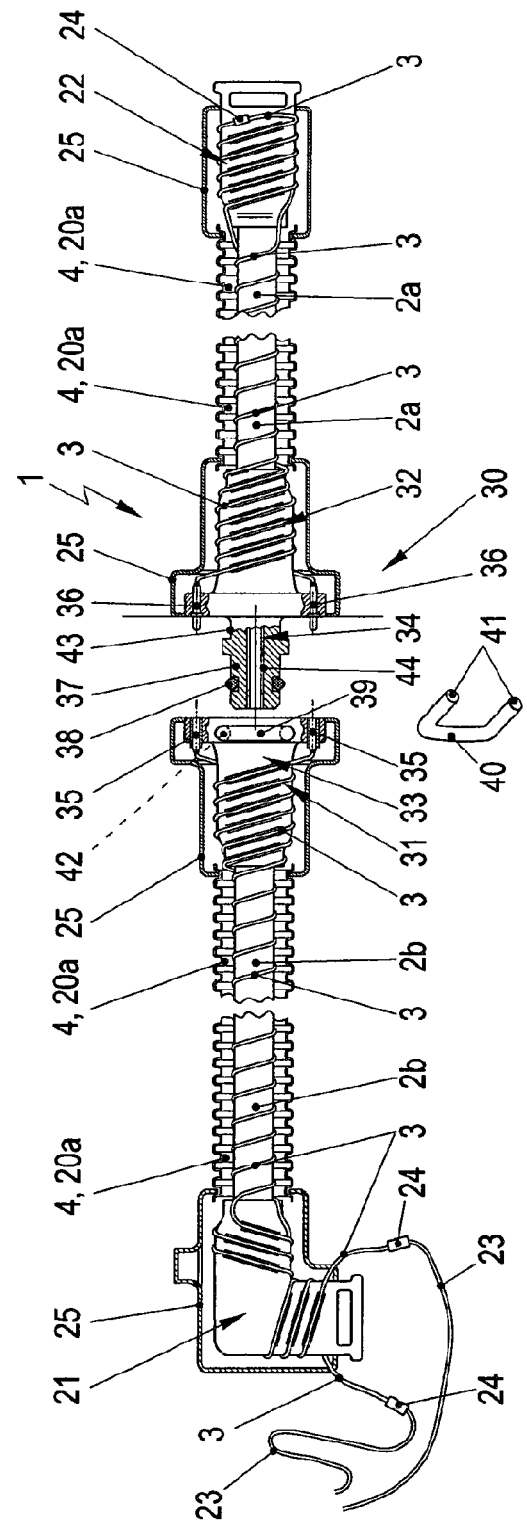

The other two embodiments of a heatable fluid line 1 according to the invention, which is illustrated in FIGS. 7 and 8, represent additions to the illustration of FIG. 5; they indicate how the connection region of the fluid line 1 according to the invention can be configured. The assembled ends of the fluid line 1 in FIGS. 7 and 8 are each identical to each another and are also identical to the configuration of FIG. 5.

In the embodiment according to FIG. 7, the connection region is implemented similarly as in the representation in FIG. 1 as an undetachable connection between the two longitudinal sections 2a, 2b, which are differently configured with respect to their material and performance characteristics. With regard to the method step of production of the invented line 1 illustrated by FIG. 5, it should also be stated that the beginning of the pipeline strand 2s can also be produced from the at least two interconnected longitudinal sections 2a, 2b, which have a different configuration according to the invention with regard to their material and performance characteristics. After the pipeline strand 2s is wound and cut, a preferably axially circumferentially closed corrugated tube 20a can be mounted on the fluid line segments 1s as an additional part of the line casing 4, after the two longitudinal sections 2a, 2b, for example, one pipe section 2a and one hose section 2b, have been at least fluidically connected, or also have been electrically connected as will be explained below with reference to FIG. 8.

In the central part of FIG. 8 is represented as an example a preferred possibility for how the different longitudinal sections 2a, 2b of the fluid line 1 according to the invention can be detachably connected together. This connection can take place especially by means of a connection device 30 consisting of two coupling parts 31, 32, each featuring one of two corresponding interconnectable fluid coupling parts 33, 34, which are each connected to one of the two longitudinal sections 2a, 2b being joined; each of said coupling parts also has at least one electric plug connector 35, 36, so that the fluid coupling parts 33, 34, on the one hand, and the electric plug connector 35,36, on the other hand, can be jointly, that is, simultaneously connected or separated by joining or separating of the two coupling parts 31, 32.

In this connection device 30, the fluid coupling part 34 features a set of circumferentially sealed plugs 37, which can be inserted into a sleeve opening 39 of the other fluid coupling part 33. A U-shaped retaining bracket 40 with two retaining legs 41 can be pushed through transverse openings 42 in the region of the sleeve opening 39, and the retaining legs 41 of the retaining bracket 40 run through a retaining contour 43 of the plug set 37, which is configured, for example, as an annular groove, in order to lock this plug connection to prevent loosening. FIG. 8 shows, in addition, that a heat conducting casing 44 is arranged to guide heat from the region surrounding the heat conductors 3 into the region of the plug set 37, for example, inside the fluid channel of the fluid coupling part 34.

The electrical plug connector parts 35, 36 can be held against the fluid coupling parts 31, 32 or alternatively inside protective caps 25 of the fluid coupling parts, which form an encapsulation for the connector device 30. The electrical plug connector parts 35, 36 can be molded into the plastic material of the fluid coupling parts 31, 32 or installed into receptacle openings.

Especially in cases where the heat conductor 3 is adaptively connected and rests against the interior of the pipeline 2 or is guided through said pipeline, the assembly of the fluid line 1 according to the invention can occur through a discontinuous braid integration, that is, by providing line segments, that is, longitudinal sections 2a, 2b of the fluid line 1 according to the invention, which are connected to connector parts 50, 51. FIGS. 9 to 11 relate to this. FIG. 9 shows the principle of an overall configuration of this kind of heatable fluid line 1 according to the invention, wherein both the connector parts 50, 51 and also the line connection designated by reference number 52 are shown in a highly schematized form. The heat conductor 3 forms a loop 3c in the connector part 50 shown on the left of the figure, whereas the free ends 3d of the heat conductor are guided through the connector part 51 illustrated on the right of the figure.

FIGS. 10 and 11 show in detail two preferred embodiments of line connectors, preferably the already mentioned QC, with which—as connector parts 50, 51—one such fluid line 1 can be assembled. FIG. 10 relates to a connector part 50 like that in the left side of FIG. 9, and FIG. 11 relates to a connector part 51 like that illustrated in right side of FIG. 9. It is characteristic for both connector parts 50, 51 that each features diverter means 54, 55 for the particular heat conductor 3 in a housing 52, 53. The diverter means 54, 55 can each be configured as a single piece with a housing 52, 53 or as installation parts, as illustrated.

In contrast to the illustration of FIG. 9, which shows the longitudinal section 2a of the material containing the technical grade plastic on the left, the housings 52, 53 of both connector parts 50, 51—thus also the connector part 50 in FIG. 10—are configured in such a way that they feature on one side a spindle 56, 57 for attachment of a second hose segment forming longitudinal section 2b of the invented line 1 and on the other side a plug insertion opening 58, 59.

The housing 53 of connector part 51, through which the free ends 3d of the heat conductor 3 are guided, features an opening 60 for extraction of the ends of the heat conductor 3d, in addition to its diverter means 55.

The heat conductors 3 in this embodiment of the fluid line 1 according to the invention can be forced through the pipeline 2 and/or its longitudinal sections 2a, 2b, with compressed air, for example, or can be threaded in with the aid of suitable means. For the first kind of assembly, it is important that the interior wall 61 of the pipeline 2 be particularly smooth so that it can provide only a small coefficient of resistance during this process step. This is easily possible both for technical grade and also for premium plastics. In particular a PTFE interior coating or an interior coating of another fluoropolymer is viewed as being particularly advantageous in this regard.

Figure 12:
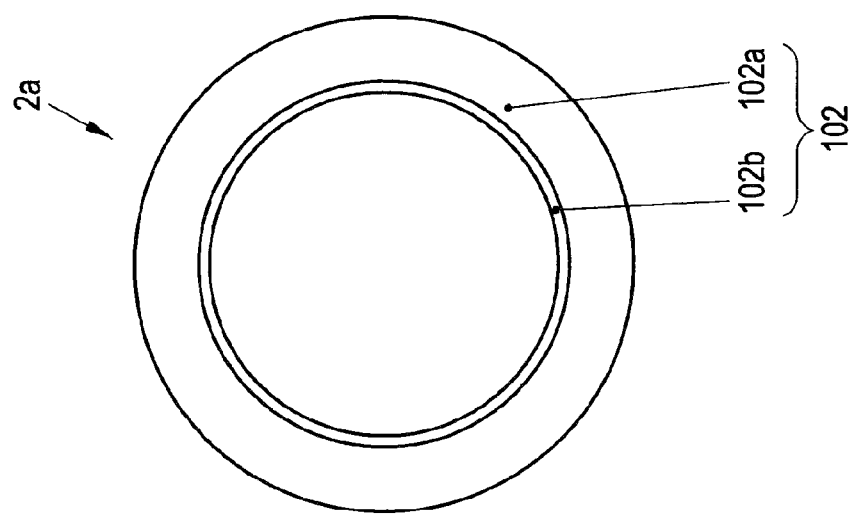
FIG. 12 shows a preferred configuration of a first longitudinal section of a heatable fluid line according to the invention shown in cross section.

FIG. 12 shows a cross section of a preferred embodiment of a first longitudinal section 2a of a heatable fluid line 1 according to the invention. The tube wall 102 has a two-layer structure in this embodiment. It comprises an outer wall 102a preferably made from a technical grade plastic, such as PA 12, and an inner wall 102b preferably made from a fluoropolymer, such as PTFE. The inner wall 102b can be configured comparatively thin, that is, it can be merely a surface coating on the outer wall 102, that is, with a maximum wall thickness of about 300 μm, wherein the comparatively thicker outer wall 102a ensures the required mechanical stability. In order to ensure an economical consumption of material during the production process—meaning primarily of the technical grade plastic—the longitudinal section 2a features a heat and cold resistance tailored to the requirements and, in particular due to the fluorine-containing polymer of the inner wall 102b, an elevated resilience due to the fluid flowing therein, for example, an increased chemical resistance, especially with respect to water absorption and/or hydrolysis. The coefficient of friction of the interior wall 102a is low with respect to pressure losses in the flowing medium and also with respect to the assembly method discussed above.

Figure 13:
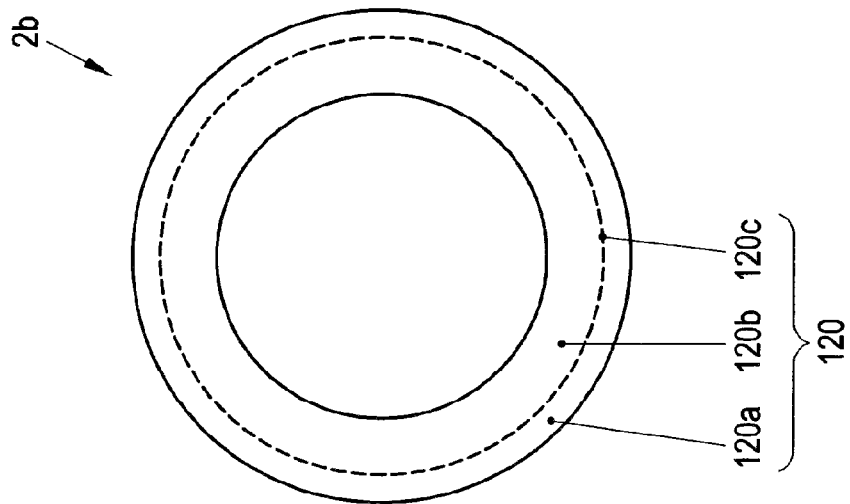
FIG. 13 shows preferred configuration of a second longitudinal section of a heatable fluid line according to the invention shown in cross section.

FIG. 13 shows in cross section a preferred embodiment of a second longitudinal section 2b of a heatable fluid line 1 according to the invention. The tube wall 120 has a three-layer structure in this embodiment. The second longitudinal section 2b is configured as a possibly flexible tube segment and is also configured for greater stress in comparison to the first longitudinal section 2a, especially for greater interior pressure and higher and/or lower temperatures. The wall 120 comprises an outer wall 120a made preferably from a high performance plastic, such a filled PPA, for example, and an inner wall 120b preferably made from a fluoropolymer, such as ETFE. In between is provided a reinforcement 120c which is for example a layer of fabric made4 of aramid. The reinforcement could also be embedded in the outer wall 120a or in the inner wall 120b, or can be entirely omitted. In order to ensure an economical consumption of material for production of the outer wall 120b using the comparatively low cost high performance plastic PPA (or even a technical grade or standard plastic, if only the chemical resistance is important), the longitudinal section 2b features an increased heat and cold resistance tailored to the stress, and also an increased resilience to the fluid flowing within it, for example an increased chemical resistance, especially with respect to water absorption and/or hydrolysis, as a result of the fluorocarbons arranged in particular on the interior side. The coefficient of friction of the inner wall 120a is low with respect to the pressure losses of flowing medium and with respect to the assembly method discussed above. Increased pressures, such as freeze pressure and/or even pressure pulses, in the invented fluid line 1 as a result of the reinforcement 120c can be effectively compensated.

With regard to further details about the possibilities for configuring the additional advantageous embodiments of the preferred detachable connection arrangement described in FIG. 8 for the different longitudinal sections 2a, 2b of the invented fluid line 1, refer to FIGS. 14 to 24 in their entirety and to the discussion below.

And with regard to the fluid coupling and connector parts and/or their housings 14, 15, 16, 17, 21, 22, 33, 34, 50, 51, 52, 53, the invention advantageously provides that one such part at the end of the first longitudinal section 2a of an invented fluid line 1 is made from a first material containing a first polymer, and one such part at the end of the second longitudinal section 2b is made from a second material containing a second polymer, wherein the material of the part 14, 15, 16, 17, 21, 22, 33, 34, 50, 51, 52, 53 at the end of the second longitudinal section 2b features a higher resilience than the material of the part 14, 15, 16, 17, 21, 22, 33, 34, 50, 51, 52, 53 at the end of the first longitudinal section 2a. These materials can be, but do not have to be, entirely identical to those of the corresponding longitudinal section 2a, 2b at whose end the particular part is located, but should preferably be similar to the material according to the invention used for the corresponding longitudinal section 2a, 2b, that is, they should exhibit a lower or greater resilience with respect to temperature and chemical resistance and/or pressure.

One preferred connection arrangement 201, to which FIGS. 14 to 24 refer, is used for fast and detachable consistent connection of two electrically heatable longitudinal sections 202 and 204 of a fluid line 1 according to the invention and consists for this purpose of two coupling parts 206 and 208. The coupling parts 206, 208 each feature, on the one hand, one of two corresponding mutually connectable fluid coupling parts (210, 212) interconnectable in a fluidic manner and each connected to one of the two longitudinal sections 202, 204 being joined and, on the other hand, also each features one of two corresponding interconnectable electric plug connectors 214, 216, in such a way that first the fluid coupling parts 210, 212, and then the electrical plug connector parts 214, 216, can be jointly, that is, virtually simultaneously, connected by interconnecting of the two coupling parts 206, 208. Likewise, first the fluid coupling parts 210, 212, and then the electrical plug connector parts 214, 216, are separated by separating the two coupling parts 206, 208. The connection arrangement 201 consequently allows a fast joining and separation of the fluid connection and of the, that is, at least one, electrical connection in only one common joining or separation process, respectively.

Each heatable longitudinal section 202, 204 consists of a media line 218 configured as a hose or tube made, for example, of plastic, which corresponds to the pipeline 20 of the fluid line 1 of the invention according to FIGS. 1 to 13 and is equipped with at least one electric heating element 220 for heating of the medium contained therein. In the illustrated preferred embodiments, each media line 218 features two heating elements 220, 222. The/each heating element 220, 222 is preferably formed by a heat conductor 224, which is wound in a screw-line shape around the media line 218 across the length thereof; said heat conductor consists of a suitable electrical resistance wire material, so that heat is generated by means of a flow of current. The/each heat conductor 224 of the heating elements 220, 222 is illustrated in a highly simplified manner as a zigzag line in FIGS. 14 to 20, and the heating elements 220, 222 are illustrated symbolically as replacement resistors R2, R4 in FIG. 23. The/each heat conductor 224 can also run—at least in sections—in a straight line in the longitudinal direction of the media line 218.

The fluid coupling parts 210, 212 also each feature at least one electric heating element 226 for heating of the fluid, wherein these at least two heating elements 226 of the two fluid coupling parts 210, 212 are directly and electrically connected or connectable by means of the electrical plug connectors 214, 216. The fluid coupling parts 210, 212 according to the invention—together with the heating elements 226 and the electrical plug connectors 214, 216—are surrounded in addition by an encapsulation 228 divided into two housing parts 230, 232 in one coupling plane 228. One of the two housing parts 230, 232 of the encapsulation 234 is allocated to each coupling part 206, 208 or to its fluid coupling part 210, 212, respectively.

FIG. 23 illustrates the heating elements 226 of the fluid coupling parts 210, 212 symbolically as replacement resistors R3, and the encapsulation 234 with the housing parts 230, 232 is indicated simply by means of a dashed line.

In a preferred embodiment, each coupling part 206, 208 features at least one additional second electrical plug connector part 236, 238, wherein either the two heating elements 222 (R4) of the two fluid line sections 202, 204 are directly connected or can be connected according to either FIG. 23, or two additional heating elements 240 of the fluid coupling parts 210, 212 are connected or can be connected according to FIGS. 14 to 21 by means of these second electrical plug connector parts 236, 238. The additional heating elements 240—similarly as the already mentioned heating elements 220, 222 and 226—are each also formed by one electric heat conductor 224. Each heating element 220, 222, 226, 240 encloses at least in part the associated fluid coupling part 210, 212 and/or the associated fluid line section 202, 204 and/or media line 218. As was already mentioned, each heat conductor 224 preferably has a helical, in particular a screw-line shaped profile. However, the/each heat conductor 224 can also run in a straight line at least in some sections. Due to the direct connection of the heat conductor 224 to the associated plug connector 214, 216, 236, 238 produced according to the method according to the invention described above, the latter will also be heated in a positive manner, so that a favorable warming of the interior within the encapsulation 234 is also obtained.

In another advantageous embodiment, the fluid line sections 204, 204 connected to the fluid coupling parts 210, 212 are each surrounded by a line casing 242 together with the associated heating elements 220, 222. Each line casing 242 passes over on one end into one of the housing parts 230, 232 of the encapsulation 234 of the coupling parts 206, 208 in a positive manner herein. Each line casing 242 is preferably accommodated on one end in the associated housing part 230, 232. Each line casing 242 can thus preferably consist of a corrugated tube, wherein the encapsulation 234 engages in a positive locking manner into the perimeter contour of the corrugated tube in the region of an accommodation opening. Reference is made in particular to FIG. 21 with regard to this.

As is also evident from FIGS. 14 to 19 and from FIGS. 23 and 24, each fluid line section 202, 204 is preferably connected to an electrically heatable line connector 224, 246 at its other end positioned opposite to the associated coupling part 206, 208 of the connection arrangement 201. These line connectors 244, 246 are preferably configured as plug connector parts, for example, as receiving sleeves for plugs or as plugs for insertion into corresponding plug openings. Each line connector 244, 246 also features at least one electrical heating element 248—especially in the form of a winding with a heat conductor 224 analogous to the other heating elements—and also an encapsulation 250, which encases the particular connector with the heating element 248 (cf. esp. FIG. 15), wherein the particular line casing 242 in this end region also passes into the particular encapsulation 250 and is held therein especially in a positive locking manner. In this way, the entire line and connection device is encased by an encapsulation arrangement illustrated in particular in FIG. 19. Reference is made in particular to the representation in FIG. 15 regarding this matter.

Several features of the embodiments, which are only partially represented or are not visible in the schematic illustrations, shall be briefly explained at this point.

The coupling parts 206, 208 can be provided with any suitable retaining means, for example, detachable snap connectors, for mutual locking in the connected coupling position according to FIGS. 15 and 20. Such retaining means, especially snap connectors, can be provided on the fluid coupling parts 210, 212 and/or on the housing parts 230, 232 of the encapsulation 234. The entire connection arrangement 201 can be held together, for example, only by means of snap connectors on the encapsulation 234. FIG. 21, which also corresponds to the central part of FIG. 8, is merely shown as an example and represents solely one of numerous possible embodiments and indicates that the one fluid coupling part, for example, 210, features a plug lug 251 sealed on the perimeter by a gasket 253 and can be inserted into a sleeve opening 255 of the other fluid coupling part, for example, 212. A U-shaped retaining clamp 257 with two retaining legs 259 can be inserted through transverse openings 261 in the region of the sleeve opening 255 in order to lock this plug connection to prevent it from becoming detached, wherein the retaining legs 259 of the retaining clamp 257 run through a retaining contour of the plug lug 251 configured, for example, as an annular groove 263. FIG. 21 additionally illustrates as an example that a heat conducting casing 265 is provided within the fluid channel of the fluid coupling part 210 in order to conduct heat from the region surrounded by the heating elements 226, 240 into the region of the plug lug 251.

The electrical plug connectors 214, 216 (optionally also 236, 238) are mounted by means of retaining means on the fluid coupling parts 210, 212 or alternatively inside the encapsulation 234. According to FIG. 21, the plug connectors 214, 216, 236, 238 can be molded into the plastic material of the fluid coupling parts 210, 212 or can be locked into receiving openings.

The fluid coupling parts 210, 212 and the associated housing parts 230, 232 of the encapsulation 324 are additionally secured with respect to each other by means of retaining means (not illustrated).

The encapsulation 234 can additionally be optionally filled, for example, cast, at least in part with a thermal insulating material. A heat insulating air gap can also be formed between the encapsulation 234 and the particular coupling part 206, 208.

The housing parts 230, 232 of the encapsulation located in the region of the separating plane can be butt joined together to create the seal or can overlap and be intermated and held together in particular by means of retaining means.

In addition, each housing part 230, 232 of the encapsulation can consist of two especially equal halves, thus in particular of so-called "equal parts." But unequal parts are also within the scope of the invention.

As is evident from FIG. 20, for example, the/each heating element 226, 240 of each fluid coupling part 210, 212 can be connected by means of a contact element 252—formed preferably by means of a crimp connector—to the associated heating element 220, 222 of the fluid line section 202, 204. As an alternative to this, FIG. 21 indicates that the/each heating element 220, 222 of each line section 202, 204 can pass as a single piece, without being divided, into the heating element 226 and/or 240 of the particular fluid coupling part 210, 212. The heat conductor 224 of appropriate length is guided consistently for this purpose from the particular media line 218 via the particular fluid coupling part 210, 212.

FIG. 22—which also corresponds essentially to FIG. 4—shows in this connection, for example, an embodiment of the sections 202 and/or 204 of the fluid line, which is initially continuously wound practically as an "endless line" with the heat conductors 224. The heat conductors 224 are then covered by a casing, especially in the form of at least one casing wrapped in a screw-line shape with a self-adhesive tape 262. For assembly, that is, for connecting to the particular fluid coupling part 210/212 and to the other end of the line connector 244/246, the prefabricated fluid line will be cut off with a certain excess length, wherein the excess length is dimensioned in such a way that the heat conductor 224 can be unwound over such a length from end sections 218a of the media line 218 that these unwound ends can then be wound on the particular fluid coupling part 210/212 and/or the particular line connector 244/246. The excess ends 218a of the media line 218 "freed" of the heat conductors 224 are cut off as "waste" before the line is connected to the coupling part or line connector, respectively. Due to this favorable procedure according to the invention, the heat conductors 224 have a consistent profile without interruptions and additional connector parts, such as crimp connectors.

As is shown FIG. 23, for example, all available heating elements 220, 222, 226, 248 and possibly 240 (FIGS. 14 to 21) can be electrically connected in series. The series connection can be supplied at a separate location with a supply voltage, especially from a vehicle battery (not illustrated) of an on-board vehicle electric network. Possible power injection sites are identified by reference character "E" in FIG. 23. A combined series-parallel connection or even a parallel connection can be used, depending on the wiring of the heating elements. It is expressly noted herein that all possible connections and power injection variants are within the scope of the invention. Basically also a consistent heat conductor 224 without separating and connection points, for example, can form all the provided heating elements in that it is consistently wound around all components to be heated. The individual separating and connecting points would then be the electrical plug connectors 214, 216, 236, 238 of the coupling parts 206, 208 of the connection arrangement 201—provided the preferred connection arrangement 201 is used.

FIG. 24 illustrates the use of the connection arrangement 201—similar to that of FIGS. 2a and 2b. This pertains again to an SCR catalyst system of an internal combustion engine of a motor vehicle, wherein a fluid tank 254 is to be connected to an injection device 256 that injects the fluid, an aqueous urea solution for selective catalytic reduction of nitrogen oxides, into an exhaust line 258 of the internal combustion engine (not illustrated). In this connection, the connection arrangement 201 allows a separation of the line connection between the tank 254 and the injection device 256. This simplifies the assembly of parts within the vehicle. The tank 254 is generally assembled first. For this purpose, it is advantageous to connect the tank before or during assembly to the first fluid line section 202, preferably via the line connector 244.

The tank connection is often no longer accessible during subsequent vehicle assembly steps. The injection device 256 can nevertheless still be connected via the already previously assembled fluid line section 202, which is handled by simple and fast means using the second fluid line section 204, in that merely the coupling parts 206, 208 of the connection arrangement 201 need to be interconnected. The two fluid line sections 202, 204 consequently have preferably different lengths. The length of the shorter first fluid line section 202 herein amounts preferably to a maximum of 50 percent of the length of the longer second fluid line section.

Accordingly, the invention provides that the sections 202, 204 of the media line 218 connected or to be connected via the connection arrangement 201 are structured differently with respect to their material and performance characteristics. For example, as was already indicated above, one section of the media line 218 can be made of a lower cost shaped tube of plastic, such as PA, for instance, whereas for the other section of the media line 218 is a more flexible hose made of rubber-elastic, in particular with multiple layers of, for example, fabric-reinforced material configured for greater stress, especially higher temperatures and/or higher internal pressure, can be used, or a line segment made of a higher quality plastic, such as PPA (polyphthalamide) configured for higher stress, especially higher temperatures and/or higher internal pressure, can be used. This line section is then configured for specific stress, such as higher temperatures, like those occurring primarily in the vicinity of the injection device 256 and of the exhaust line 258, and also for adaptation to an expansion in fluid volume in case of freezing and to the resulting freezing pressure. In contrast, the former stated section of the media line 218 consisting of PA (polyamide), for example, is very favorable in cost and can thus be used especially for greater lengths within a vehicle. It can also be advantageous according to the application illustrated in FIG. 4 to divide the entire line connection between the tank 254 and the injection device 256 into at least three sections, wherein two different kinds of line are connected via a connection device in the vicinity of the tank 254 and in the vicinity of the injection device 256, and of course in a detachable manner via the preferred connection arrangement 201 (for example, near the tank) or in an undetachable manner via any other kind of connection 201' (for example, in the vicinity of the injection device 256). The central longer line segment can be made of lower cost material, whereas a higher quality material can be used for the outer shorter line segments, especially a material suitable for higher temperatures and/or higher pressure.

The invention is not limited to the combination of features defined in the independent claims, but can rather also be defined by any other particular combination of specific features of all separately disclosed features. This means that basically any individual feature of the independent claims can be omitted or can be replaced by at least one individual feature disclosed elsewhere in the application. The claims are inasmuch to be understood merely as an initial attempt at formulating an invention.

The invention is also not limited to the illustrated exemplary embodiments, but the person skilled in the art can rather supplement them, as needed, by means of additional practical technical measures without thereby departing from the scope of the invention.

The corrugated tube 20a can be formed, for example, from a first or second material, especially from a technical grade plastic and/or—at least in part—from a high performance plastic, preferably according to the longitudinal section 2a, 202, 2b, 204 which it encases. The same applies also to the fluid coupling and/or connector parts, in particular to the housing 14, 15, 16, 17, 21, 22, 33, 34, 50, 51, 52, 53, 206, 208, 210, 212, 230, 232, 244, 246 thereof and/or to the encapsulation or encasement 234, 250 thereof.

The person of ordinary skill in the art can finally find additional details with regard to the possibilities for wounding the connector elements 14, 15, 16, 17, 21, 22, 33, 34, 50, 51, 52, 53, 206, 208, 210, 212, 230, 232, 244, 246 and pipeline 2, 218 with the heat conductor 3, 224 of the already mentioned document EP 1 985 908 A1.

The invention claimed is:

1. An SCR-catalyst system of an internal combustion engine comprising a heatable fluid line with at least one pipeline and at least one electrical heat conductor extending over at least a partial section of the length (L) of the pipeline, the pipeline connecting a tank of the SCR-catalyst system to an injection device of the SCR-catalyst system by means of connector parts between the pipeline and the tank and the pipeline and the injection device, the pipeline having at least two longitudinal sections joined together and being detachable in one of a destructive or non-destructive manner, the at least two longitudinal sections having different material properties and/or performance characteristics thereof, the at least two longitudinal sections including at least one first longitudinal section of a first material having a first polymer and a second longitudinal section of a second material having a second polymer, wherein the material of the second longitudinal section is more flexible and/or has a higher resilience than the material of the first longitudinal section, the polymer of the first longitudinal section being a technical grade plastic containing at least one polyamide selected from PA 6, PA66, PA 11 and PA 12, and the polymer of the second longitudinal section being a high performance plastic containing one of a fluoropolymer, a polyarylene ether ketone (PEAK), a polyphthalamide (PPA), a polyarylene sulfide, and PA 612.

2. The system according to claim 1, wherein the material of the second longitudinal section has a greater resilience with regard to temperature, chemical resistance and/or pressure than the material of the first longitudinal section.

3. The system according to claim 1, wherein the second material contains an elastomer, for example, ethylene propylene diene rubber (EPDM), ethylene propylene rubber (EPM), hydrated acrylonitrile butadiene rubber (HNBR) and/or a thermoplastic elastomer (TPE).

4. The system according to claim 1, wherein the pipeline has at least two longitudinal sections made from the first material, and/or at least two longitudinal sections made from the second material.

5. The system according to claim 1, wherein the at least two longitudinal sections are joined to each other in a detachable nondestructive manner via a connection arrangement having at least two corresponding mutually connectable fluid coupling parts that are each connected to one of the at least two longitudinal sections that are being joined.

6. The system according to claim 5, wherein the connecting arrangement includes two coupling parts each of which features one of two corresponding mutually connectable fluid coupling parts that are each connected to one of the at least two longitudinal sections that are being joined, and also at least one electric plug connector part each, in such a way that the fluid coupling parts and the electric plug connector parts can be jointly connected or separated, respectively, by interconnecting or disconnecting of the two coupling parts.

7. The system according to claim 1, wherein a connecting part is provided at an end of the first longitudinal section and is made from the first material containing the first polymer, and a connecting part is provided at an end of the second longitudinal section and is made from the second material containing the second polymer, wherein the second material has a higher resilience than the first material.

8. The system according to claim 1, wherein the first and second longitudinal sections have difference lengths (La, Lb) with the length (Lb) of the second longitudinal section being up to 50% of the length (La) of the first longer longitudinal section.

9. The system according to claim 1, wherein the pipeline generally has a circular cross section, and wherein the cross section of the pipeline deviates from the circular shape at least in some sections.

10. The system according to claim 1, wherein the heat conductor rests on the pipeline and is adaptively connected to the pipeline.

11. The system according to claim 1, wherein the heat conductor and the pipeline are enclosed by line casings formed from a circumferentially closed corrugated tube that is made from the first and second material corresponding to the longitudinal section encases thereby.

12. The system according to claim 1, wherein a wall of the first and second longitudinal sections has a multilayer structure with an inner wall including a fluorine-containing polymer and wherein the second longitudinal section includes a reinforcement.

13. The system according to claim 1 being assembled according to a method comprising the steps of: continuously winding a pipeline strand with the at least one electrical heat conductor to form an intermediate product; cutting the intermediate product into fluid line segments each featuring overly long sections on a terminal side; unwinding a length of the electrical heat conductor from each of the overly long sections; separating the overly long sections from the fluid line segments after the unwinding of the electrical heat conductors from the overly long section to obtain pipeline ends; connecting the pipeline ends to connector parts; and winding at least a portion of the connector parts with the unwound portions of the electrical heat conductors.

14. The system according to claim 13, wherein the pipeline strand is formed by at least two longitudinal sections that are differently configured with regard to their geometric properties, their material and/or performance characteristics and are interconnected in an undetachable manner.

15. The system according to claim 13, being assembled according to a method further comprising the step of covering the electrical heat conductor with a, pipeline casing produced at least in sections by means of at least one of a winding in screw shape with a self-adhesive tape and covering with a corrugated tube that is axially pushed on after the pipeline strand has been continuously wound with the at least one electrical heat conductor and after the preassembled intermediate product has been cut into fluid segments.

16. The system according to claim 15, wherein the corrugated tube is attached after the two longitudinal sections have been at least fluidically connected together.

17. The system according to claim 1, wherein the pipeline includes longitudinal sections of the second material in a vicinity of the tank and in a vicinity of the injection device, and further includes a longitudinal section of the first material arranged therebetween.

18. The system according to claim 1, wherein the pipeline includes only two longitudinal sections, the first longitudinal section of the first material being adjacent to the tank and the second longitudinal section of the second material being adjacent to the injection device.

19. The system according to claim 1, wherein a wall of at least one of the first and second longitudinal sections is of a multi-layer construction.

20. The system according to claim 19, wherein a first layer of the multi-layer construction is one of the technical grade plastic and a high-performance plastic.

21. The system according to claim 20, wherein an inner layer of the multi-layer construction is a fluoropolymer.

22. The system according to claim 19, wherein a first layer of the first longitudinal section is a technical grade plastic and a first layer of the second longitudinal section is a high-performance plastic.

23. The system according to claim 22, wherein an inner layer of at least one of the first and second longitudinal sections is a fluoropolymer.

24. The system according to claim 23, wherein the one of the first and second longitudinal sections also includes an outer layer, the inner layer comprising ethylene-tetrafluoroethylene (ETFE) and the outer layer comprising polyphthalamide (PPA).

25. The system according to claim 23, wherein the one of the first and second longitudinal sections also includes an outer layer, the inner layer comprising ethylene-tetrafluoroethylene (ETFE) and the outer layer comprising polyphthalamide (PPA).

26. The system according to claim 1, wherein an inner layer of both the first and second longitudinal sections is a fluoropolymer.

27. The system according to claim 1, wherein a wall of the second longitudinal section is of a multi-layer construction and includes a reinforcement layer.

28. The system according to claim 27, wherein the reinforcement layer is embedded within another layer of the multi-layer construction.

29. The system according to claim 27, wherein the reinforcement layer is embedded within a layer of high-performance plastic.

30. The system according to claim 27, wherein the reinforcement layer is a fabric layer.

31. An SCR-catalyst system of an internal combustion engine comprising a heatable fluid line with at least one pipeline and at least one electrical heat conductor extending over at least a partial section of the length (L) of the pipeline, the pipeline connecting a tank of the SCR-catalyst system to an injection device of the SCR-catalyst system by means of connector parts between the pipeline and the tank and the pipeline and the injection device, the pipeline having at least three longitudinal sections joined together and being detachable in one of a destructive or non-destructive manner, at least two of the at least three longitudinal sections having different material properties and/or performance characteristics thereof, the at least three longitudinal sections including at one first longitudinal section of a first material having a first polymer and two second longitudinal sections of a second material having a second polymer, wherein the material of the two second longitudinal sections is more flexible and/or has a higher resilience than the material of the first longitudinal section, wherein one of the two second longitudinal sections is located in the vicinity of the injection device and the other of the two second longitudinal sections is located in the vicinity of the tank.

32. An SCR-catalyst system of an internal combustion engine comprising a heatable fluid line with at least one pipeline and at least one electrical heat conductor extending over at least a partial section of the length (L) of the pipeline, the pipeline connecting a tank of the SCR-catalyst system to an injection device of the SCR-catalyst system by means of connector parts between the pipeline and the tank and the pipeline and the injection device, the pipeline having at least two longitudinal sections joined together and being detachable in one of a destructive or non-destructive manner, the at least two longitudinal sections having different material properties and/or performance characteristics thereof, the at least two longitudinal sections including at least one first longitudinal section of a first material having a first polymer and a second longitudinal section of a second material having a second polymer, wherein the material of the second longitudinal section is more flexible and/or has a higher resilience than the material of the first longitudinal section, wherein the second longitudinal section is located in the vicinity of the injection device and the first longitudinal section is separated from the injection unit by the second longitudinal section.

* * * * *